US00RE48209E

(19) United States
(12) Reissued Patent
Pai

(10) Patent Number: US RE48,209 E
(45) Date of Reissued Patent: Sep. 15, 2020

(54) DISPLAY APPARATUS AND METHOD FOR DRIVING DISPLAY PANEL THEREOF

(71) Applicant: Novatek Microelectronics Corp., Hsinchu (TW)

(72) Inventor: Feng-Ting Pai, Hsinchu (TW)

(73) Assignee: Novatek Microelectronics Corp., Hsinchu (TW)

(21) Appl. No.: 14/470,946

(22) Filed: Aug. 28, 2014

Related U.S. Patent Documents

Reissue of:
(64) Patent No.: 8,253,651
Issued: Aug. 28, 2012
Appl. No.: 11/842,960
Filed: Aug. 22, 2007

(30) Foreign Application Priority Data

Jun. 29, 2007 (TW) ..... 96123780

(51) Int. Cl.
*G09G 3/20* (2006.01)
*G09G 3/36* (2006.01)
(Continued)

(52) U.S. Cl.
CPC ..... *G09G 3/3666* (2013.01); *G09G 3/3614* (2013.01); *G09G 2310/061* (2013.01); *G09G 2310/08* (2013.01); *G09G 2320/0261* (2013.01)

(58) Field of Classification Search
CPC ..... G09G 3/3666; G09G 3/3614; G09G 2310/061; G09G 2310/08
(Continued)

(56) References Cited

U.S. PATENT DOCUMENTS 5,365,284 A * 11/1994 Matsumoto et al. ..... 348/793
5,436,747 A 7/1995 Suzuki
(Continued)

FOREIGN PATENT DOCUMENTS

JP 2-214818 8/1990
JP 11-175037 7/1999
(Continued)

OTHER PUBLICATIONS

"Office Action of Japan Counterpart Application", issued on Nov. 24, 2010, p1-p4, in which the listed references were cited.
(Continued)

*Primary Examiner* — Adam L Basehoar
(74) *Attorney, Agent, or Firm* — JCIPRNET

(57) ABSTRACT

A display apparatus and a method for driving a display panel thereof are provided. Each column of data line in the display panel has two sub-data lines. The driving method is described as follows. An input image signal is divided into a plurality of image segments, and each of the image segments has display data of pixels coupled to two adjacent scan lines. Every K image segments are defined as a group. An image signal is formed by inserting a reset data in each group of image segments. Display data of a first group are written in K batches according to a first start wave. After a predetermined time from the first start wave, the scan lines corresponding to the first group are driven at the same time according to a second start wave, and the reset data is output to the first sub-data lines and the second sub-data lines.

27 Claims, 14 Drawing Sheets

(51) Int. Cl.

| | |
|---|---|
| ***G09G 5/02*** | (2006.01) |
| ***G09G 5/00*** | (2006.01) |
| ***H04N 3/14*** | (2006.01) |

(58) Field of Classification Search
USPC ..... 345/3.2, 55, 58, 88, 204, 208, 598; 348/793
See application file for complete search history.

(56) References Cited

U.S. PATENT DOCUMENTS

| | | | | |
|---|---|---|---|---|
| 5,440,322 | A * | 8/1995 | Prince et al. | 345/58 |
| 6,278,437 | B1 * | 8/2001 | Iga et al. | 345/598 |
| 6,545,655 | B1 * | 4/2003 | Fujikawa | 345/87 |
| 6,853,372 | B2 * | 2/2005 | Kanzaki | G09G 3/3696 345/208 |
| 7,719,505 | B2 * | 5/2010 | Pai | G09G 3/3677 345/100 |
| 2003/0006948 | A1 * | 1/2003 | Son | G09G 3/3648 345/87 |
| 2003/0058234 | A1 * | 3/2003 | Kanzaki | G09G 3/3648 345/211 |
| 2004/0056831 | A1 * | 3/2004 | Takatori et al. | 345/88 |
| 2006/0044292 | A1 * | 3/2006 | Shen | G09G 3/3659 345/204 |
| 2007/0194319 | A1 * | 8/2007 | An | G02F 1/13452 257/72 |

FOREIGN PATENT DOCUMENTS

| | | |
|---|---|---|
| JP | 2003-280599 | 10/2003 |
| JP | 2006-11430 | 1/2006 |
| JP | 2006-330640 | 12/2006 |
| TW | 559772 | 11/2003 |
| TW | 200509037 | 3/2005 |
| TW | 200527361 | 8/2005 |
| TW | I253049 | 4/2006 |

OTHER PUBLICATIONS

"Office Action of Taiwan Counterpart Application", issued on May 29, 2012, p1-p8, in which the listed references were cited.

* cited by examiner

DISPLAY APPARATUS AND METHOD FOR DRIVING DISPLAY PANEL THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application *is a reissue of U.S. Pat. No. 8,253,651, filed on Aug. 22, 2007 and issued on Aug. 28, 2012, which* claims the priority benefit of Taiwan application serial no. 96123780, filed Jun. 29, 2007. [All disclosure of the Taiwan application] *The entirety of each of the above-mentioned applications and patents* is incorporated [herein] by reference *and made a part of this specification.*

BACKGROUND OF THE INVENTION

1. Field of the Invention

The present invention relates to a display apparatus and a method for driving a display panel thereof. More particularly, the present invention relates to an LCD display apparatus and a method for driving a display panel thereof.

2. Description of Related Art

In order to satisfy the demands for display quality of LCD TV market, liquid crystal display panels are developed gradually towards specifications of high resolution, impulse systems, and high frame rates. However, the above specifications will influence charging time which is already at the margin, and the details are described as follows.

FIG. 1 is a schematic view of the architecture of a conventional display system of double frame-rate. A display panel 101 of the system is divided into an upper half part and a lower half part, and gate drivers 102 and 103 at left and right sides of the display panel 101 are used to drive scan lines (not shown) of the display panel 101, so as to further turn on pixels coupled to the scan lines. Meanwhile, source drivers 104 and 105 on upper and lower sides of the display panel 101 are also used to provide display data required by pixels that have been turned on in the upper half and the lower half parts, respectively.

The above system also adopts the impulse system technology, and the signal timing in the system is as shown in FIG. 2. FIG. 2 is a timing diagram of signals of the system of FIG. 1. STV1-STV4 are gate start driving signals, VCLK is a clock signal, OE is an output enable signal, /OE is an inverted signal of OE, and VG1-VGn are gate pulse signals. As shown in FIG. 2, the impulse system technology adopts a time-division driving method of each scan line to separate the writing time of image data and reset signal (for inserting black frames). In addition, it would be known from FIG. 2 that if the writing time of the image data and the reset signal is averaged, the effective charging time of the two is H/2-Trc. Here, H is scan time of the scan lines, and Trc is delay time of RC. If the writing time of the image data and the reset signal is not averaged, for example, the image data is written for the time of 2H/3 and the reset signal is written for the time of H/3, the effective charging time of the image data and the reset signal is 2H/3-Trc and H/3-Trc, respectively.

The reset signal for inserting black frames is originally used to solve the problem of motion blur generated by hold-type display. However, under the condition of improving the frame rate, the charging time will be at the margin. Even if the charging time of the image data is extended, the charging time of the reset signal will be insufficient, which results in ineffective charging, and the target value of the reset signal cannot be obtained. Therefore, the performance of the analog impulse type display will be degraded, and the problem of motion blur cannot be solved effectively.

SUMMARY OF THE INVENTION

The present invention is directed to a display apparatus, which can provide double frame rate, and effectively eliminate motion blur.

The present invention is also directed to a method for driving a display panel, which can provide double frame rate, and effectively eliminate motion blur.

As embodied and broadly described herein, the present invention provides a display apparatus, which includes a display panel, a gate driver, a first source driver, and a second source driver. The display panel includes M rows of scan lines, N columns of data lines, and M×N pixels. Each column of the data line includes a first sub-data line and a second sub-data line. The pixels are arranged in a matrix, in which the pixel of an (i)th row and a (j)th column is denoted by P(i, j), where $1 \le i \le M$, and $1 \le j \le N$. The first sub-data line of the (j)th column and an (i)th scan line are coupled to the pixel P(i, j). The second sub-data line of the (j)th column and an (i+1)th scan line are coupled to a pixel P(i+1, j). Here, N, M, i, and j are positive integers. The gate driver drives the scan lines, and the first source driver and the second source driver control the first sub-data lines and the second sub-data lines respectively, and output an image signal. The image signal has a plurality of image segments, and each of the image segments has display data of pixels coupled to two adjacent scan lines. Every K image segments are defined as a group, where K is a positive integer. Each group of image segments includes a reset data. The gate driver drives the scan lines corresponding to a first group in K batches according to a first start wave, and drives two adjacent scan lines each time. When the two adjacent scan lines are driven, the first source driver outputs the display data corresponding to the pixels coupled to the (i)th scan line among the scan lines that have been driven, and the second source driver outputs the display data corresponding to the pixels coupled to the (i+1)th scan line among the scan lines that have been driven. After receiving the first start wave for a predetermined time, the gate driver drives the scan lines corresponding to the first group at the same time according to a second start wave, and the first source driver and the second source driver output the reset data to the first sub-data lines and the second sub-data lines, respectively.

As embodied and broadly described herein, the present invention further provides a display apparatus, which includes a display panel, a gate driver, a first source driver, and a second source driver. The display panel includes M rows of scan lines, N columns of data lines, and M×N pixels. Each column of the data line includes a first sub-data line and a second sub-data line. The pixels are arranged in a matrix, in which the pixel at an (i)th row and a (j)th column is denoted by P(i, j), where $1 \le i \le M$, and $1 \le j \le N$. The first sub-data line of the (j)th column is coupled to the pixel P(i, j) at a coupling point of an (i)th scan line, a pixel P(i+1, j) at a coupling point of an (i+1)th scan line, till a pixel P(i+n, j) at a coupling point of an (i+n)th scan line. The second sub-data line of the (j)th column is coupled to a pixel P(i+n+1, j) at a coupling point of an (i+n+1)th scan line, a pixel P(i+n+2, j) at a coupling point of an (i+n+2)th scan line, till a pixel P(i+2n+1, j) at a coupling point of an (i+2n+1)th scan line. Here, N, M, i, j, and n are positive integers. The gate driver drives the scan lines, and the first source driver and the second source driver control the first sub-data lines and the second sub-data lines respectively, and output an image signal. The image signal has a plurality of image segments, and each of the image segments has display data of pixels coupled to two adjacent scan lines. Every K image segments are defined as a group, where K is a positive integer. Each group of image segments includes a reset data. The gate driver drives the scan lines corresponding to a first group in K batches according to a first start wave, and drives two adjacent scan lines each time. When the two adjacent scan lines are driven, the first source driver outputs the display data corresponding to the pixels coupled to the (i+n)th scan line among the scan lines that have been driven, and the second source driver outputs the display data corresponding to the pixels coupled to the (i+n+1)th scan line among the scan lines that have been driven. After receiving the first start wave for a predetermined time, the gate driver drives the scan lines corresponding to the first group at the same time according to a second start wave, and the first source driver and the second source driver output the reset data to the first sub-data lines and the second sub-data lines respectively.

As embodied and broadly described herein, the present invention further provides a display apparatus, which includes a display panel, a gate driver, and a source driver. The display panel includes M rows of scan lines, N columns of data lines, and M×N pixels. Each column of the data line includes a first sub-data line and a second sub-data line. The pixels are arranged in a matrix, in which the pixel at an (i)th row and a (j)th column is denoted by P(i, j), where 1≤i≤M, and 1≤j≤N. The first sub-data line of the (j)th column and an (i)th scan line are coupled to the pixel P(i, j). The second sub-data line of the (j)th column and an (i+1)th scan line are coupled to a pixel P(i+1, j). Here, N, M, i, and j are positive integers. The gate driver drives the scan lines, and the source driver controls the first sub-data lines and the second sub-data lines, and outputs an image signal. The image signal has a plurality of image segments, and each of the image segments has display data of pixels coupled to two adjacent scan lines. Every K image segments are defined as a group, where K is a positive integer. Each group of image segments includes a reset data. The gate driver drives the scan lines corresponding to a first group in K batches according to a first start wave, and drives two adjacent scan lines each time. When the two adjacent scan lines are driven, the source driver outputs the display data corresponding to the pixels coupled to the (i)th scan line among the scan lines that have been driven to the first sub-data lines, and outputs the display data corresponding to the pixels coupled to the (i+1)th scan line among the scan lines that have been driven to the second sub-data lines. After receiving the first start wave for a predetermined time, the gate driver drives the scan lines corresponding to the first group at the same time according to a second start wave, and the source driver outputs the reset data to the first sub-data lines and the second sub-data lines.

As embodied and broadly described herein, the present invention further provides a display apparatus, which includes a display panel, a gate driver, and a source driver. The display panel includes M rows of scan lines, N columns of data lines, and M×N pixels. Each column of the data line includes a first sub-data line and a second sub-data line. The pixels are arranged in a matrix, in which the pixel at an (i)th row and a (j)th column is denoted by P(i, j), where 1≤i≤M, and 1≤j≤N. The first sub-data line of the (j)th column is coupled to the pixel P(i, j) at a coupling point of an (i)th scan line, a pixel P(i+1, j) at a coupling point of an (i+1)th scan line, till a pixel P(i+n, j) at a coupling point of an (i+n)th scan line. The second sub-data line of the (j)th column is coupled to a pixel P(i+n+1, j) at a coupling point of an (i+n+1)th scan line, a pixel P(i+n+2, j) at a coupling point of an (i+n+2)th scan line, till a pixel P(i+2n+1, j) at a coupling point of an (i+2n+1)th scan line. Here, N, M, i, j, and n are positive integers. The gate driver drives the scan lines, and the source driver controls the first sub-data lines and the second sub-data lines, and outputs an image signal. The image signal has a plurality of image segments, and each of the image segments has display data of pixels coupled to two adjacent scan lines. Every K image segments are defined as a group, where K is a positive integer. Each group of image segments includes a reset data. The gate driver drives the scan lines corresponding to a first group in K batches according to a first start wave, and drives two adjacent scan lines each time. When the two adjacent scan lines are driven, the source driver outputs the display data corresponding to the pixels coupled to the (i i+n)th scan line among the scan lines that have been driven to the first sub-data lines, and outputs the display data corresponding to the pixels coupled to the (i+n+1)th scan line among the scan lines that have been driven to the second sub-data lines. After receiving the first start wave for a predetermined time, the gate driver drives the scan lines corresponding to the first group at the same time according to a second start wave, and the source driver outputs the reset data to the first sub-data lines and the second sub-data lines.

As embodied and broadly described herein, the present invention provides a method for driving a display panel. The display panel includes M rows of scan lines, N columns of data lines, and M×N pixels. Each column of the data line includes a first sub-data line and a second sub-data line. The pixels are arranged in a matrix, in which the pixel at an (i) h row and a (j)th column is denoted by P(i, j), where 1≤i≤M, and 1≤j≤N. The first sub-data line of the (j)th column and an (i)th scan line are coupled to the pixel P(i, j). The second sub-data line of the (j)th column and an (i+1)th scan line are coupled to a pixel P(i+1, j). Here, N, M, i, and j are positive integers. The driving method includes the following steps. First, an input image signal is provided. Then, the input image signal is divided into a plurality of image segments, and each of the image segments has display data of pixels coupled to two adjacent scan lines. Next, every K image segments are defined as a group, where K is a positive integer. Next, a reset data is inserted into each group of image segments. Then, the scan lines corresponding to a first group are driven in K batches according to a first start wave, and two adjacent scan lines are driven each time. When the two adjacent scan lines are driven, display data of the pixels coupled to the (i)th scan line among the scan lines that have been driven is provided to the first sub-data lines, and display data of the pixels coupled to the (i+1)th scan line among the scan lines that have been driven is provided to the second sub-data lines. Then, after a predetermined time from the first start wave, the scan lines corresponding to the first group are driven at the same time according to a second start wave, and the reset data is output to the first sub-data lines and the second sub-data lines.

As embodied and broadly described herein, the present invention further provides a method for driving a display panel. The display panel includes M rows of scan lines, N columns of data lines, and M×N pixels. Each column of the data line includes a first sub-data line and a second sub-data line. The pixels are arranged in a matrix, in which the pixel at so an (i)th row and a (j)th column is denoted by P(i, j), where $1 \leq i \leq M$, and $1 \leq j \leq N$. The first sub-data line of the (j)th column is coupled to the pixel P(i, j) at a coupling point of an (i)th scan line, a pixel P(i+1, j) at a coupling point of an (i+1)th scan line, till a pixel P(i+n, j) at a coupling point of an (i+n)th scan line. The second sub-data line of the (j)th column is coupled to a pixel P(i+n+1, j) at a coupling point of an (i+n+1)th scan line, a pixel P(i+n+2, j) at a coupling point of an (i+n+2)th scan line, till a pixel P(i+2n+1, j) at a coupling point of an (i+2n+1)th scan line. Here, N, M, i, j, and n are positive integers. The driving method includes the following steps. First, an input image signal is provided. Then, the input image signal is divided into a plurality of image segments, and each of the image segments has display data of pixels coupled to two adjacent scan lines. Next, every K image segments are defined as a group, where K is a positive integer. Then, a reset data is inserted into each group of image segments. Afterwards, the scan lines corresponding to a first group are driven in K batches according to a first start wave, and two adjacent scan lines are driven each time. When the two adjacent scan lines are driven, display data of the pixels coupled to the (i i+n)th scan line among the scan lines that have been driven is provided to the first sub-data lines, and display data of the pixels coupled to the (i+i+n+1)th scan line among the scan lines that have been driven is provided to the second sub-data lines. Then, after a predetermined time from the first start wave, the scan lines corresponding to the first group are driven at the same time according to a second start wave, and the reset data is output to the first sub-data lines and the second sub-data lines.

The present invention adopts a special display panel, in which each column of the data line includes two sub-data lines. Moreover, in the present invention, an input image signal is divided into a plurality of image segments, and each of the image segments has display data of pixels coupled to two adjacent scan lines. Every K image segments are defined as a group. Then, an image signal is formed by inserting a reset data in each group of image segments. Thereafter, display data of a first group are written in K batches according to a first start wave. After a predetermined time from the first start wave, the scan lines corresponding to the first group are driven at the same time according to a second start wave, and the reset data is output to the first sub-data lines and the second sub-data lines. Thus, the present invention can provide double frame rate, and can effectively eliminate motion blur. In addition, as the polarities of the sub-data lines do not change in a frame, the present invention can reset the data of the pixels of several adjacent scan lines at the same time.

In order to make the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

DESCRIPTION OF EMBODIMENTS

Figure 1:
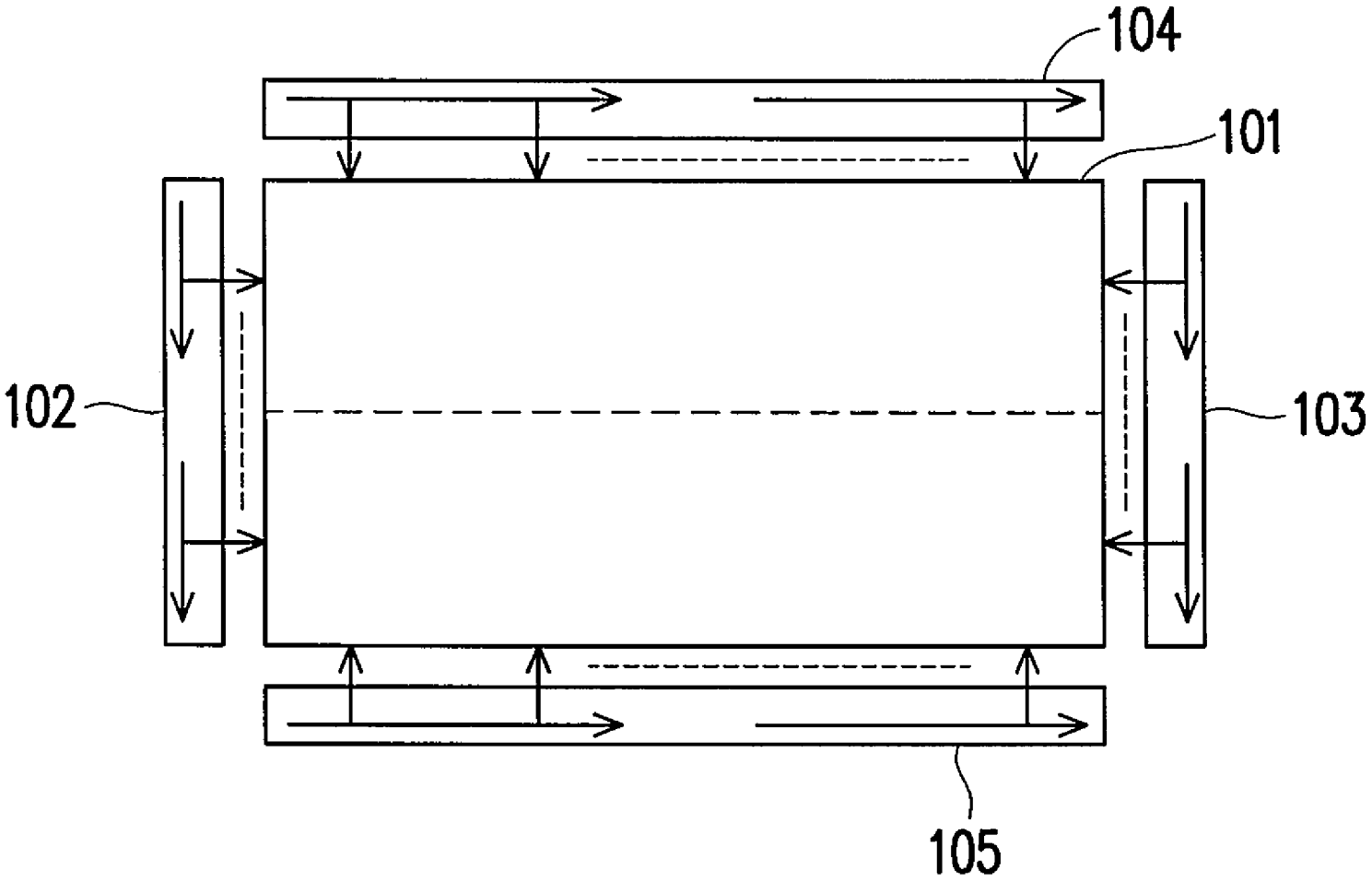
FIG. 1 (PRIOR ART)
FIG. 1 is a schematic view of the architecture of a conventional display system of double frame rate.
Figure 2:
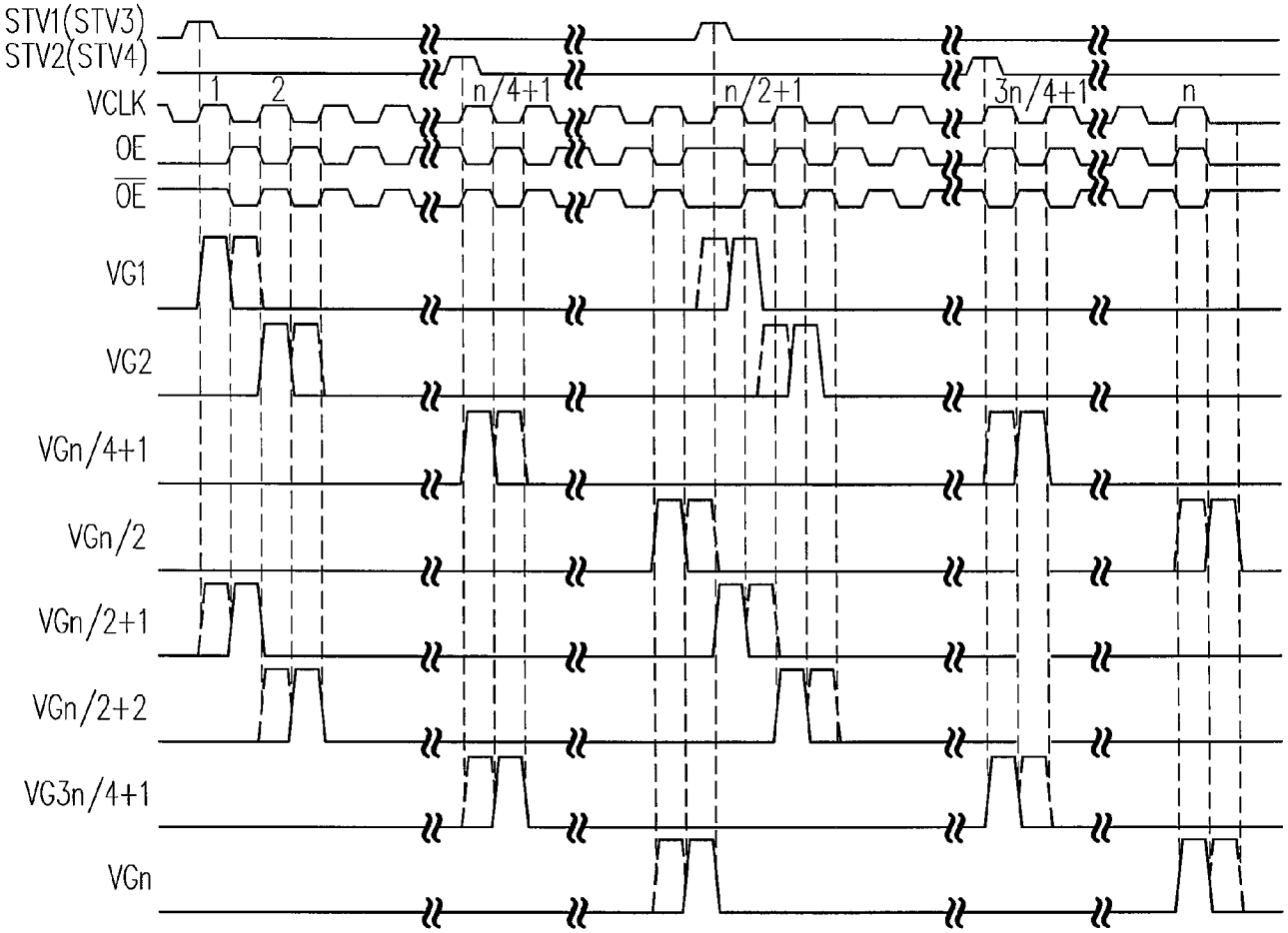
FIG. 2 (PRIOR ART)
FIG. 2 is a timing diagram of signals of the system of FIG. 1.
Figure 3:
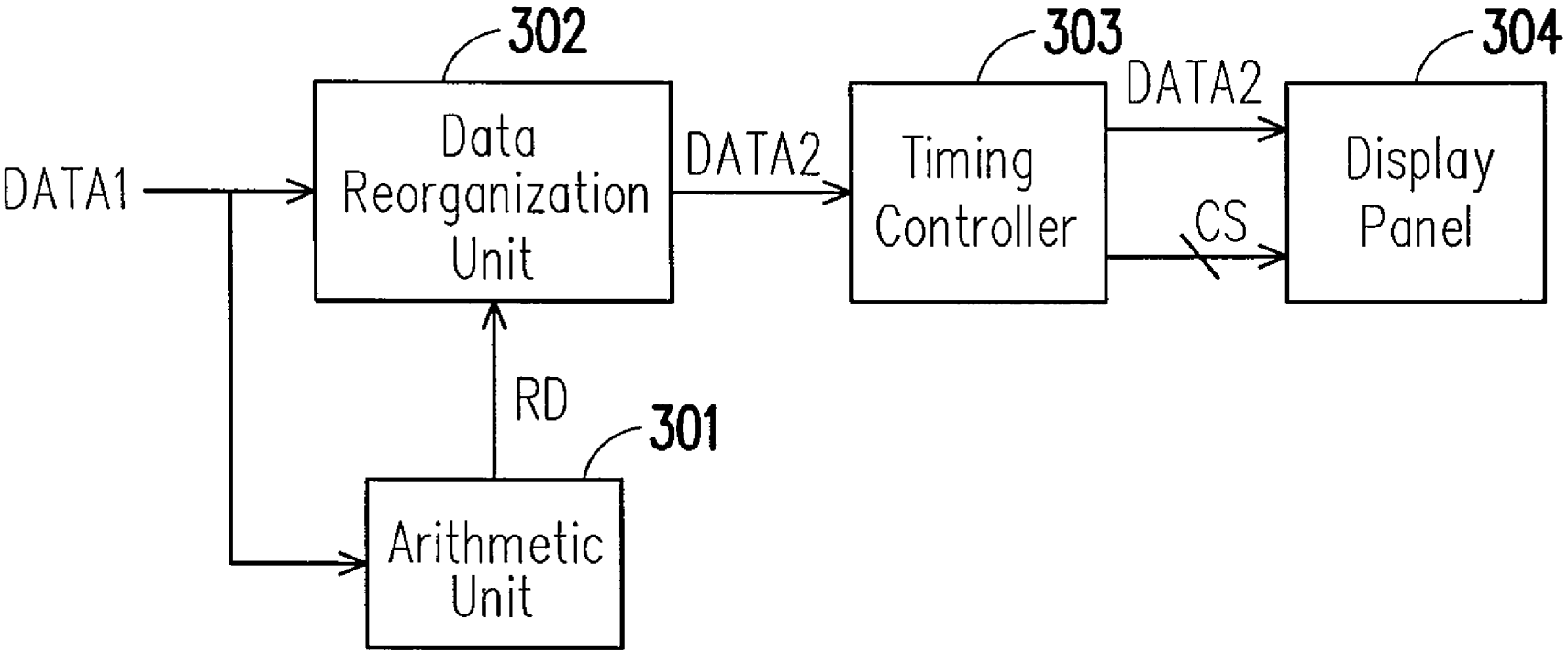
FIG. 3 is a schematic view of the architecture of a display apparatus according to an embodiment of the present invention.

FIG. 3 shows a display apparatus according to an embodiment of the present invention. The display apparatus includes an arithmetic unit 301, a data reorganization unit 302, a timing controller 303, and a display panel 304. The operations of the above components will be briefly described as follows. The arithmetic unit 301 generates a reset data RD according to an input image signal DATA1 and a counting relation that is related to a plurality of image segments (which will be described later). The reset data RD may be a black or a white image data, or an image data of any single grayscale. The data reorganization unit 302 receives the input image signal DATA1 and the reset data RD, and reorganizes the input signal DATA1 and the reset data RD, so as to generate an image signal DATA2. The timing controller 303 receives the image signal DATA2, so as to generate a plurality of control signals CS according to the image signal DATA2. Moreover, the timing controller 303 sends the plurality of control signals CS and the image signal DATA2 to the display panel 304, so as to control the display of the image signal DATA2 on the display panel 304.

Figure 4:
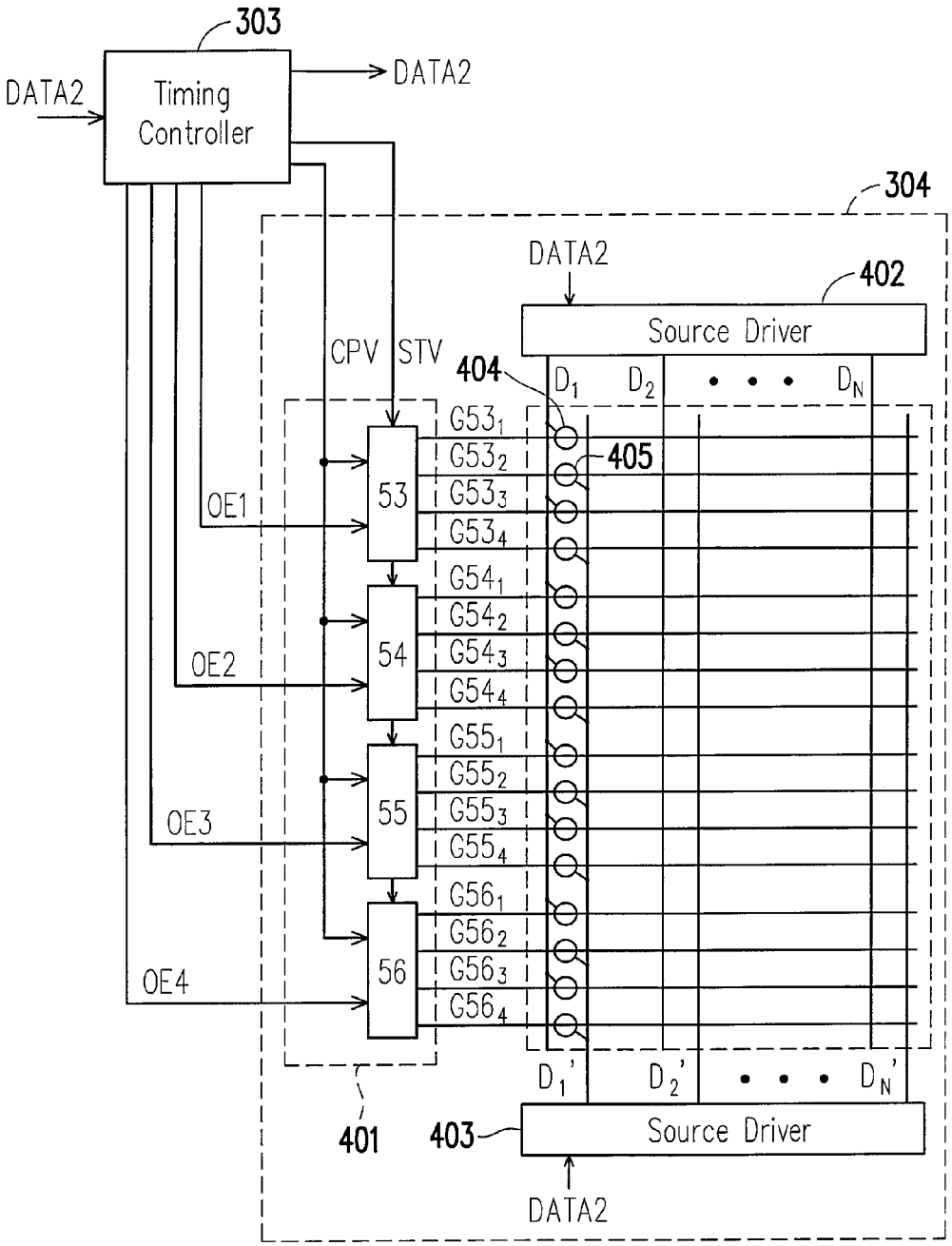
FIG. 4 is a schematic view of another implemented architecture of the display panel of FIG. 3.

FIG. 4 is an embodiment of the display panel of FIG. 3, and shows the coupling relationship between the internal components of the display panel 304 and the timing controller 303, and the image signal DATA2 and the plurality of control signals CS sent to the display panel 304 by the timing controller 303. The plurality of control signals CS includes a gate clock signal CPV, a gate start driving signal STV, and output enable signals OE1-OE4. The display panel 304 includes a gate driver 401, source drivers 402 and 403, 16 rows of scan lines, N columns of data lines, and 16×N pixels. The 16 rows of scan lines are denoted by $G53_1$-$G53_4$, $G54_1$-$G54_4$, $G55_1$-$G55_4$, and $G56_1$-$G56_4$ respectively. Each column of the data line includes a first sub-data line and a second sub-data line. The first sub-data lines are denoted by $D_1$-$D_N$ respectively, and the second sub-data lines are denoted by $D_1$-$D_N$, respectively. The 16×N pixels are arranged in a matrix, and the coupling relationship of a column of pixels in the pixel matrix is shown in this figure. For example, the pixel 404 is coupled to the scan line G53$_1$ and the sub-data line $D_1$, and the pixel 405 is coupled to the scan line G53$_2$ and the sub-data line $D_{1'}$.

The gate driver 401 further includes four scan units, which are denoted by 53-56 respectively. Each of the scan units drives four rows of scan lines. For example, the scan unit 53 drives the scan lines G53$_1$-G53$_4$ according to the gate clock signal CPV, the gate start driving signal STV, and the output enable signal OE1. After the gate driver 401 receives the gate start driving signal STV, the gate start driving signal STV is transferred inside the scan unit 53 first, and is gradually transferred to the scan unit 56. When a scan unit receives the gate start driving signal STV, the scan unit drives the scan lines coupled thereto according to the position where the gate start driving signal STV is transferred to, and the source drivers 402 and 403 send the image data corresponding to the image signal DATA2 at the same time.

Figure 5:
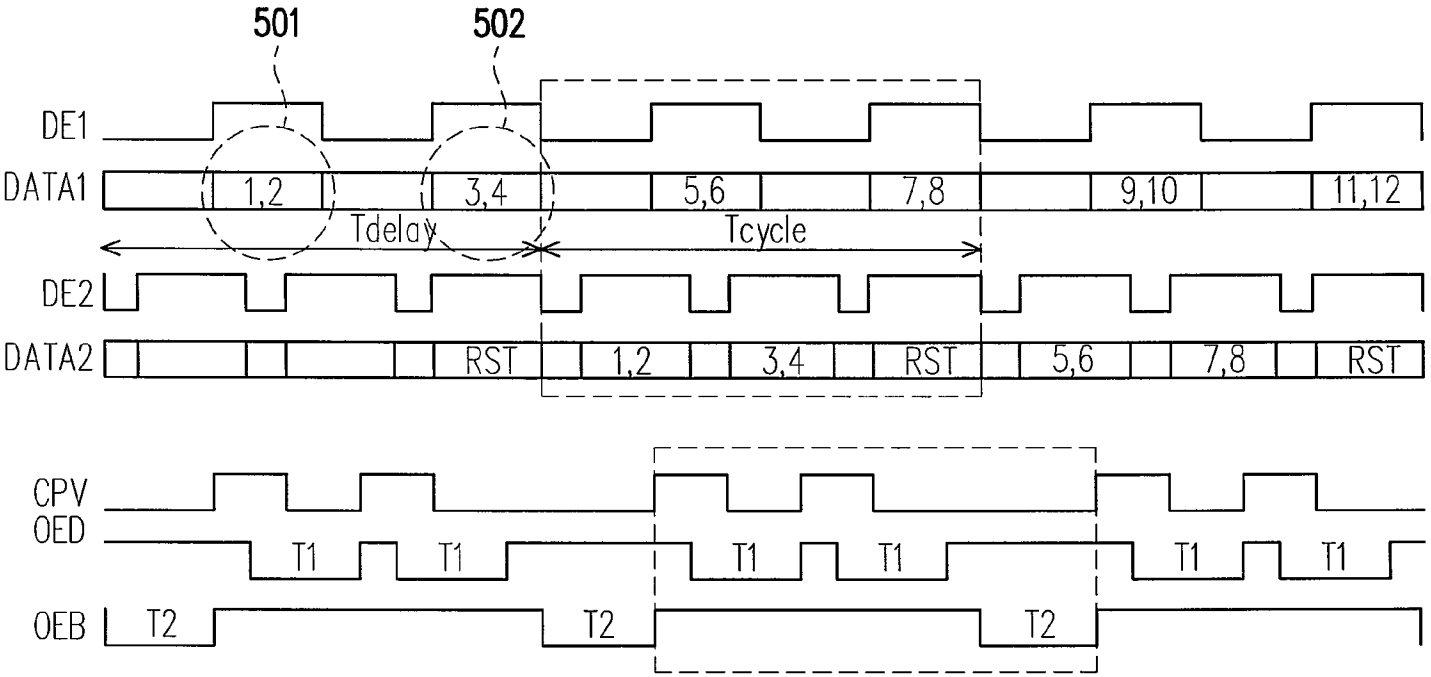
FIG. 5 is a schematic view of a data reorganization method according to the embodiment of FIGS. 3 and 4.

The data reorganization method of the input image signal DATA1 and the reset data RD is illustrated, and then the operation of the circuit in FIG. 4 will be described in detail. FIG. 5 is a schematic view of a data reorganization method according to the embodiment of FIGS. 3 and 4. Referring to FIG. 5, DE1 is a data enable signal corresponding to the input image signal DATA1, DE2 is a data enable signal corresponding to the image signal DATA2, CPV is the above gate clock signal, and OED and OEB are two signal forms of each of the output enable signals (OE1-OE4). The input image signal DATA1 has a plurality of image segments. Each of the image segments has the display data of the pixels coupled to two adjacent scan lines. For example, the image segment 501 has the display data of the pixels coupled to the scan lines G53$_1$ and G53$_2$, and the image segment 502 has the display data of the pixels coupled to the scan lines G53$_3$ and G53$_4$.

In this embodiment, every two image segments are defined as one group, and a reset data RST is inserted into each group of image segments. Thus, a time segment Tcycle originally having two batches of data have three batches of data, and the reset data RST is arranged after the image segments of each group. Therefore, the arithmetic unit 301 must generate the positions to arrange the reset data RST according to such a counting relation. In addition, as the image signal DATA2 is obtained through data reorganization, the image signal DATA2 is naturally delayed for a time of Tdelay compared with the input image signal DATA1. After the image signal DATA2 is obtained, the signal form of the output enable signal received by each of the scan units must be controlled properly, so as to control the corresponding scan lines properly according to the data timing of the image signal DATA2, so as to allow the pixels to receive correct loading data. That is to say, when the output enable signals assume the OED form, and are at a low level (represented by T1), the display data are loaded into the corresponding pixels. When the output enable signals assume the OEB form, and are at a low level (represented by T2), the reset data are loaded into the corresponding pixels.

Figure 6:
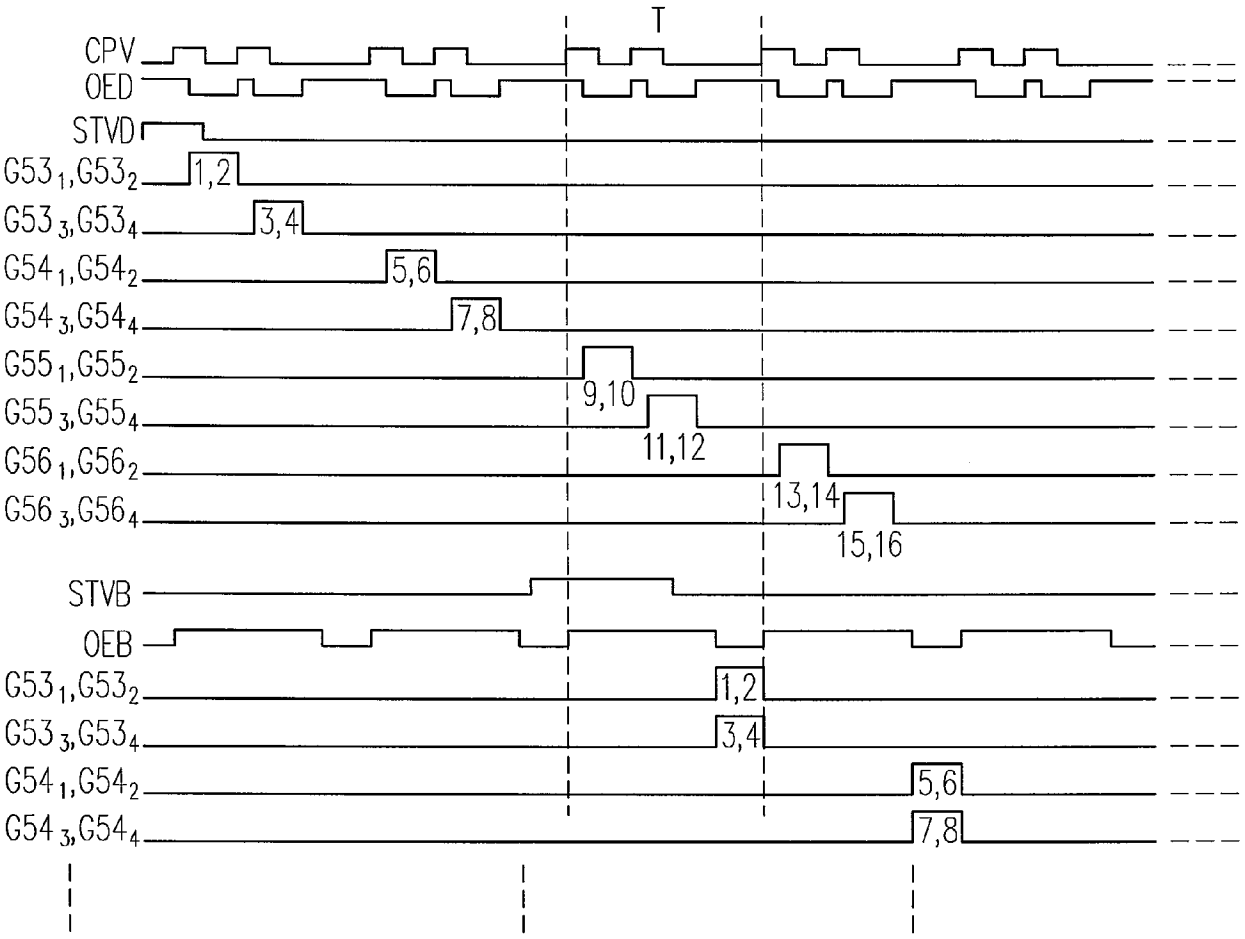
FIG. 6 is a timing diagram of a part of the signals of the circuit in FIG. 4.

FIG. 6 is a timing diagram of a part of signals of the circuit in FIG. 4, and shows the timing of the gate clock signal CPV, the two forms of output enable signals (OED and OEB), the gate start driving signal STV, and gate pulse signals between the scan lines. The gate start driving signals STV has two start waves, which are denoted by STVD and STVB, respectively. Referring to FIGS. 4 and 6 together, the operation of the circuit of FIG. 4 is described in more detail. When the timing controller 303 sends the start wave STVD to the scan unit 53, and provides the output enable signal OE1 in the OED form to the scan unit 53 and provides the output enable signal OE3 in the OEB form to the scan unit 55, the scan unit 53 will operate according to the start wave STVD, the gate clock signal CPV, and the output enable signal OE1 in the OED form.

With the transfer of the start wave STVD in the scan unit 53, the scan unit 53 drives the scan lines corresponding to the first group of the image signal DATA2 in two batches, and drives two adjacent scan lines each time. That is to say, when the output enable signal OE1 in the OED form is at a logic low level, the scan unit 53 will drive two scan lines at the same time. For example, the scan unit 53 first drives the scan lines G53$_1$ and G53$_2$ at the same time, and then drives the scan lines G53$_3$ and G53$_4$ at the same time. At the same time when the scan unit 53 drives the scan lines G53$_1$ and G53$_2$, the source driver 402 outputs the display data of the pixel coupled to the scan line G53$_1$, and the source driver 403 outputs the display data of the pixel coupled to the scan line G53$_2$. At the same time when the scan unit 53 drives the scan lines G53$_3$ and G53$_4$, the source driver 402 outputs the display data of the pixel coupled to the scan line G53$_3$, and the source driver 403 outputs the display data of the pixel coupled to the scan line G53$_4$.

After a short period of time, the start wave STVD is transmitted to the scan unit 54. At this time, the timing controller 303 provides the output enable signal OE2 in the OED form to the scan unit 54, and provides the output enable signal OE4 in the OEB form to the scan unit 56. After the scan unit 54 receives the start wave STVD, the scan unit 54 also drives the scan lines corresponding to the second group in the image signal in two batches, i.e., drives the scan lines G54$_1$ and G54$_2$ at the same time first, and then drives the scan lines G54$_3$ and G54$_4$ at the same time. At the same time when the scan lines G54$_1$ and G54$_2$ are driven, the source driver 402 outputs the display data of the pixel coupled to the scan line G54$_1$ correspondingly, and the source driver 403 outputs the display data of the pixel coupled to the scan line G54$_2$ correspondingly. At the same time when the scan lines G54$_3$ and G54$_4$ are driven, the source driver 402 outputs the display data of the pixel coupled to the scan line G54$_3$ correspondingly, and the source driver 403 outputs the display data of the pixel coupled to the scan line G54$_4$ correspondingly. More generally, at the same time when two adjacent scan lines are driven, the source driver 402 outputs the display data of the pixels coupled to the (i)th scan line among the scan lines that have been driven correspondingly, and the source driver 403 outputs the display data of the pixels coupled to the (i+1)th scan line among the scan lines that have been driven correspondingly.

Then, the timing controller 303 sends the start wave STVB to the scan unit 53. That is, after a predetermined time since the start wave STVD is output, the timing controller 303 outputs the start wave STVB. Meanwhile, the timing controller 303 provides the output enable signal OE3 in the OED form to the scan unit 55, and provides the output enable signal OE1 in the OEB form to the scan unit 53. Then, the start wave STVD is also transmitted to the scan unit 55. Therefore, the scan unit 53 starts to operate according to the start wave STVB, the gate clock signal CPV, and the output enable signal OE1 in the OEB form. The scan unit 55 also starts to operate according to the start wave STVD, the gate clock signal CPV, and the output enable signal OE3 in the OED form. Definitely, the above predetermined time may be set according to actual requirements, and is not limited to this embodiment.

The output enable signals in either the OED form or the OEB form must be at the logic low level to enable the scan lines. Therefore, when the scan unit 55 drives the scan lines ($G55_1$-$G55_4$) corresponding to the third group in the image signal according to the start wave STVD, the gate clock signal CPV, and the output enable signal OE3 in the OED form, as the output enable signal OE1 in the OEB form is at a logic high level, the scan unit 53 will not drive the scan lines coupled thereto. Moreover, since no start wave is transmitted in the scan units 54 and 56 at this time, the scan units 54 and 56 will not drive the scan lines coupled thereto as well.

At the same time when the scan unit 55 drives the scan lines coupled thereto, the source driver 402 will output the display data of the pixels coupled to the (i)th scan line among the scan lines that have been driven correspondingly, and the source driver 403 will output the display data of the pixels coupled to the (i+1)th scan line among the scan lines that have been driven correspondingly. Then, the output enable signal OE3 in the OED form assumes the logic high level, and the output enable signal OE1 in the OEB form assumes the logic low level. Therefore, during this period of time, the scan unit 53 drives the scan lines $G53_1$-$G53_4$ at the same time, and meanwhile the source drivers 402 and 403 output the reset data as well, so as to reset the display data of the pixels coupled to the scan lines $G53_1$-$G53_4$. Thus, the problem of motion blur of these pixels is avoided, and the effect of an impulse system is realized.

Then, the start waves STVD and STVB will be transmitted to the scan units 56 and 54 respectively, and the timing controller 303 provides the output enable signal OE4 in the OED form to the scan unit 56, and provides the output enable signal OE2 in the OEB form to the scan unit 54. Therefore, the scan unit 54 starts to operate according to the start wave STVB, the gate clock signal CPV, and the output enable signal OE2 in the OEB form. The scan unit 56 also starts to operate according to the start wave STVD, the gate clock signal CPV, and the output enable signal OE4 in the OED form.

As the start waves STVD and STVB will be transferred in the gate driver 401, the pixels indirectly coupled to each scan line will reset data after a predetermined time from starting to load the display data. Moreover, it can be known from the aforementioned new panel architecture and new driving method that each sub-data line is not required to change the polarity in a same frame, and only needs to write the reset data once in a period T (as shown in FIG. 6). Therefore, both the image data and the reset data can effectively utilize the limited charging time. In addition, as the output enable signals in the OED form and the OEB form assume the logic low level at different time points, the problem of loading wrong data into the pixels will not occur. In other words, the pixels that receive the display data will not receive the reset data RST, and the pixels that receive the reset data RST will not receive the display data.

Figure 7:
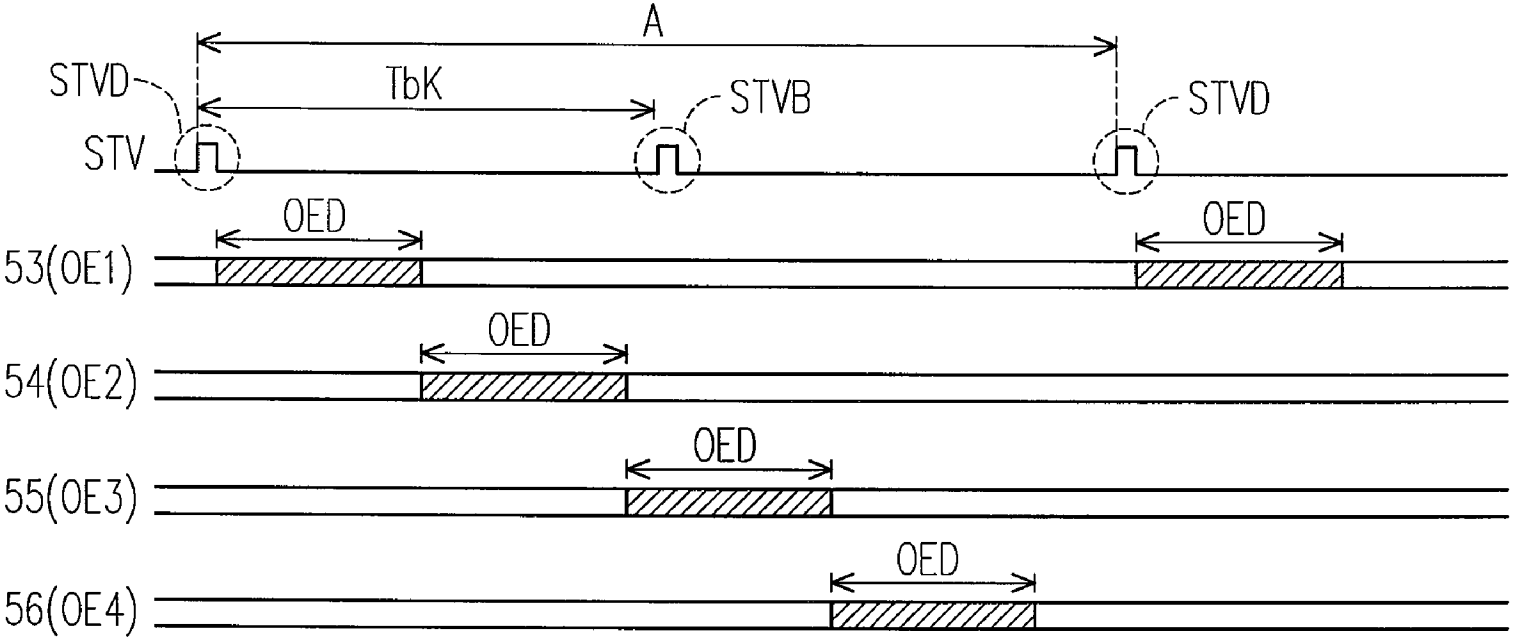
FIG. 7 is a schematic view of a scan line control method according to an embodiment of the present invention.

Then, FIG. 7 will be described below to illustrate the method for controlling the scan lines of the present invention more clearly. FIG. 7 is a schematic view of the method for controlling the scan lines according to an embodiment of the present invention, showing the signal forms of the output enable signals received by the scan units 53-56 in a frame A. It is shown clearly in this figure that after the gate driver 401 receives the start wave STVD, the scan units 53-56 will receive the output enable signals in the OED form in a period of time, and each of the scan units will receive the start wave STVB after receiving the start wave STVD for a predetermined time Tbk.

Figure 8:
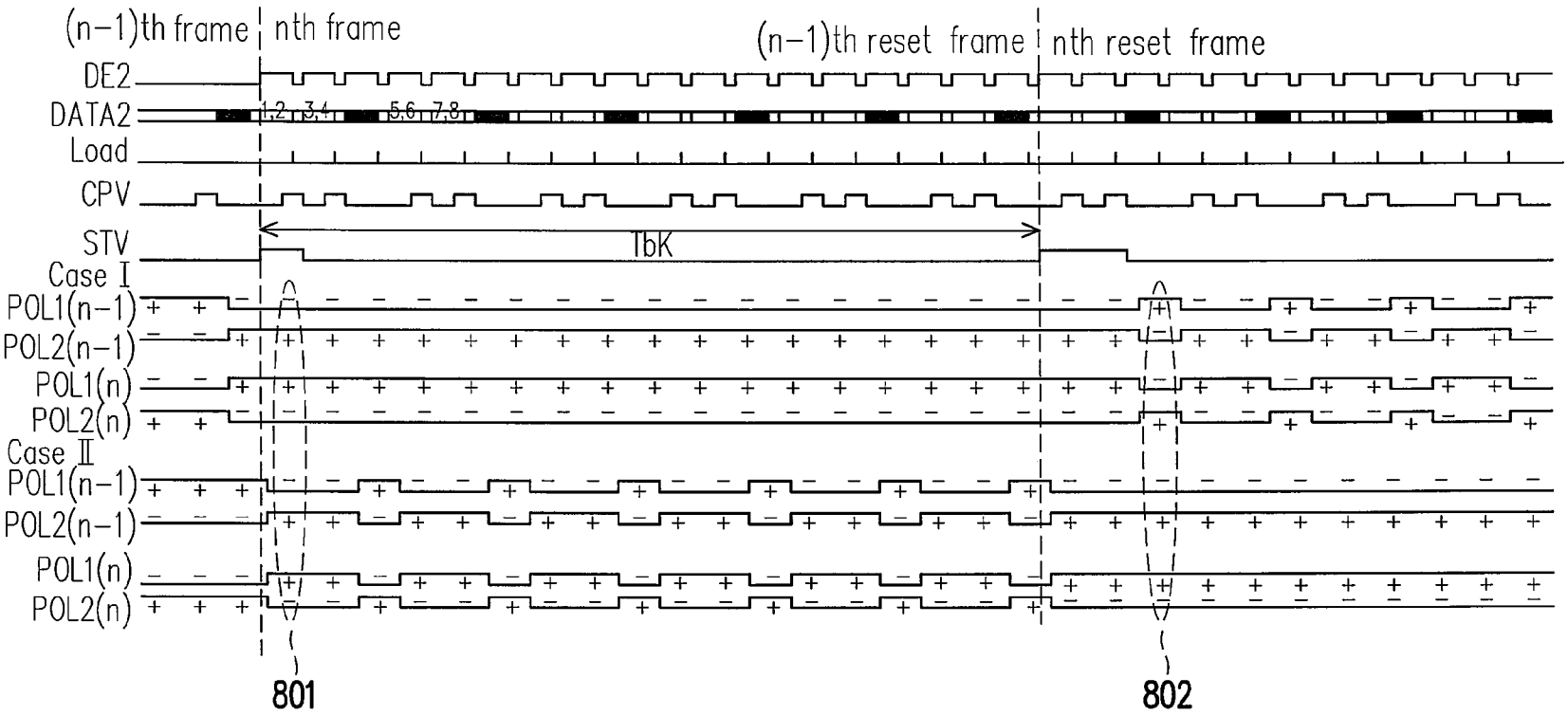
FIG. 8 is a schematic view of a method for controlling polarities of data when the circuit of FIG. 4 is operated.

The polarity control timing of FIG. 8 may be obtained according to the operation method of FIG. 6. FIG. 8 is a schematic view of a method for controlling polarities of data during the operation of the circuit of FIG. 4, in which POL1 and POL2 are polarity control signals of the source drivers 402 and 403, respectively. In this figure, the polarity is changed at two positions, namely, the time point when an (n−1)th frame is shifted to an (n)th frame, marked by 801, indicating that the polarity of the display data must be changed at this time point, and the time point when an (n−1)th reset frame is shifted to an (n)th reset frame, marked by 802, indicating that the polarity of the reset data must be changed at this time. As the output polarities of the sub-data lines have been designed and planned when the panel architecture is established, the impulse system can be realized as long as a column inversion operation is performed on the display data or the reset data in the time of a same frame, and the scan line control method shown in FIG. 7 is used as well. Thus, both the display data and the reset data can achieve the best image quality of dot inversion.

Figure 9:
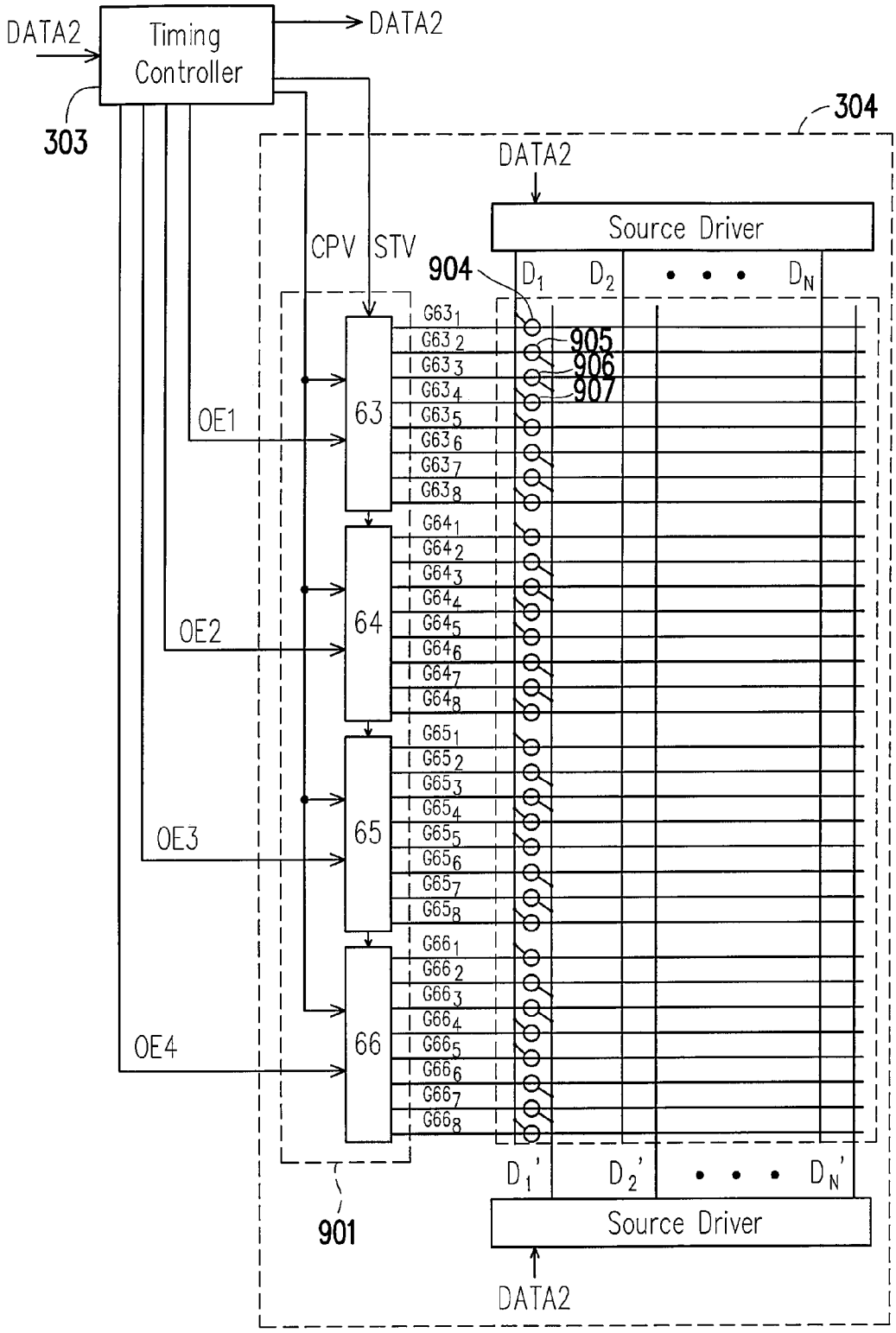
FIG. 9 is a schematic view of the architecture of the display panel of FIG. 3 according to another embodiment.

In view of the spirit of the embodiment described above, another display panel architecture can also be used to implement the driving method of the present invention, which is shown in FIG. 9. FIG. 9 shows another embodiment of the display panel of FIG. 3, and shows the coupling relationship between the internal components of another display panel 304 and the timing controller 303, and the image signal DATA2 and the plurality of control signals CS sent to the display panel 304 by the timing controller 303. Referring to FIGS. 4 and 9, the difference between the architecture of the two display panels is that the pixels are coupled in a 2-line inversion manner in FIG. 9. Taking the first four pixels in the column as shown in FIG. 9 for example, the pixel 904 is coupled to the sub-data line $D_1$ and the scan line $G63_1$, the pixel 905 is coupled to the sub-data line $D_{1'}$ and the scan line $G63_2$, the pixel 906 is coupled to the sub-data line $D_1$ and the scan line $G63_3$, and the pixel 907 is coupled to the sub-data line $D_1$ and the scan line $G63_4$. The coupling relationship of other pixels is similar to the above description. Moreover, in the gate driver 901, each scan unit is responsible for driving 8 rows of scan lines. For example, the scan unit 63 is responsible for driving the scan lines $G63_1$-$G63_8$.

Figure 10:
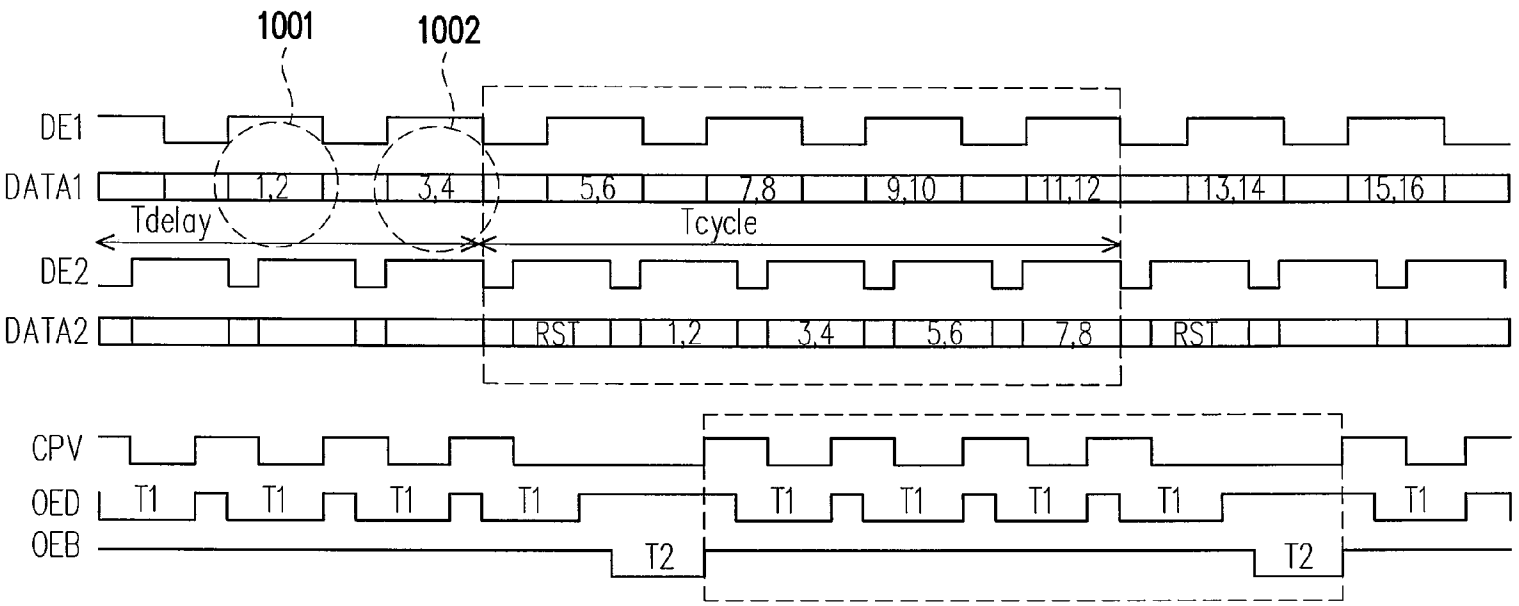
FIG. 10 is a schematic view of the data reorganization method according to the embodiment of FIGS. 3 and 9.

FIG. 10 is a schematic view of the data reorganization method according to the embodiment of FIGS. 3 and 9. In FIG. 10, DE1 is a data enable signal corresponding to the input image signal DATA1, DE2 is a data enable signal corresponding to the image signal DATA2, CPV is the above gate clock signal, and OED and OEB are two signal forms of each of the output enable signals (OE1-OE4). The input image signal DATA1 has a plurality of image segments. Each of the image segments has the display data of the pixels coupled to two adjacent scan lines. For example, the image segment 1001 has the display data of the pixels coupled to the scan lines $G63_1$ and $G63_2$, and the image segment 1002 has the display data of the pixels coupled to the scan lines $G63_3$ and $G63_4$.

Referring to FIGS. 5 and 10 together, it is known from the comparison between the figures that the data reorganization method of FIG. 10 defines four image segments as one group, and inserts a reset data RST into each group of image segments. Thus, a time segment Tcycle originally having four batches of data is changed to have five batches of data, and the reset data RST is arranged after the image segments of each group. Therefore, the aforementioned arithmetic unit 301 must generate the positions to arrange the reset data RST according to such a counting relation.

Figure 11:
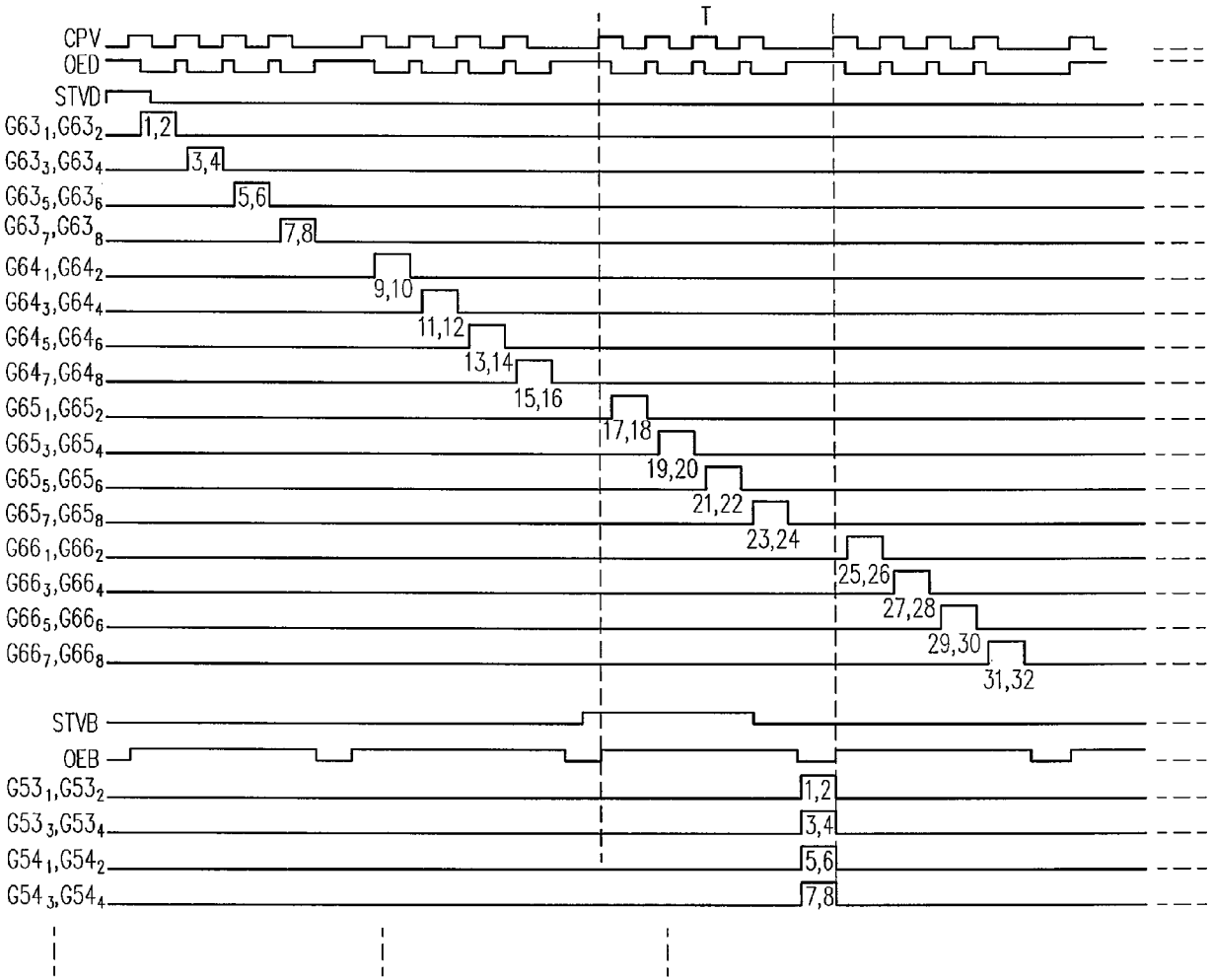
FIG. 11 is a timing diagram of a part of signals of the circuit in FIG. 9.

FIG. 11 is a timing diagram of a part of signals of the circuit in FIG. 9, and shows the timing of the gate clock signal CPV, the two forms of output enable signals (OED and OEB), the gate start driving signal STV, and gate pulse signals between the scan lines. The gate start driving signals STV also has two start waves, which are denoted by STVD and STVB, respectively. Referring to FIGS. 6 and 11 together, it is known from the comparison between the two figures that the timing of FIG. 11 is to drive the scan lines coupled to each of the scan units in four batches, and drives 8 rows of scan lines at the same time when the reset data is written.

Figure 12:
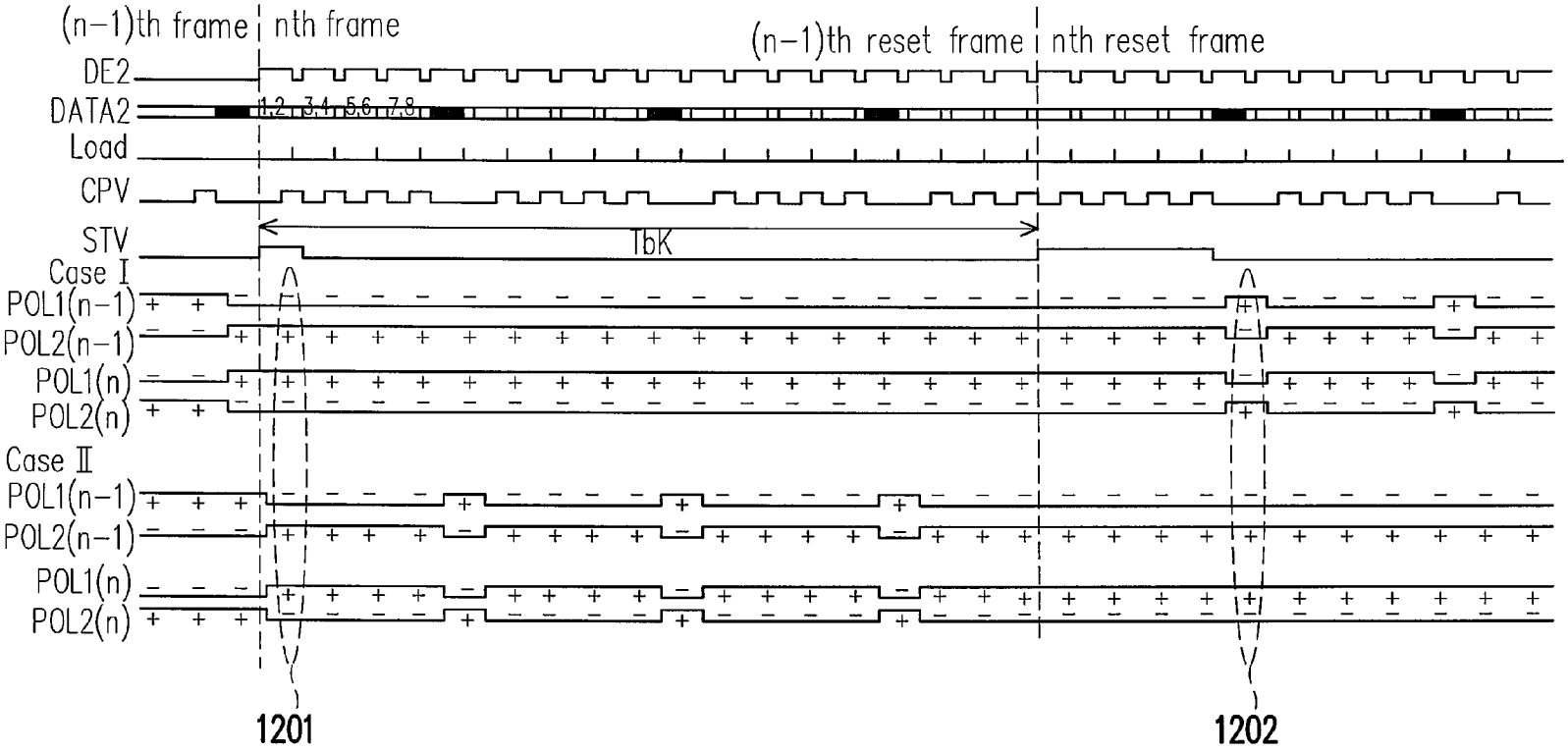
FIG. 12 is a schematic view of a method for controlling polarities of data when the circuit of FIG. 9 is operated.

The polarity control timing of FIG. 12 may be obtained according to the operation method of FIG. 11. FIG. 12 is a schematic view of the method for controlling of polarities of data during the operation of the circuit of FIG. 9, in which POL1 and POL2 are polarity control signals of the source drivers 402 and 403 respectively. In this figure, the polarity is also changed at two positions, namely the time point when an (n−1)th frame is shifted to an (n)th frame, marked by 1201, indicating that the polarity of the display data must be changed at this time, and the time point when an (n−1)th reset frame is shifted to an (n)th reset frame, marked by 1202, indicating that the polarity of the reset data must be changed at this time.

Figure 13:
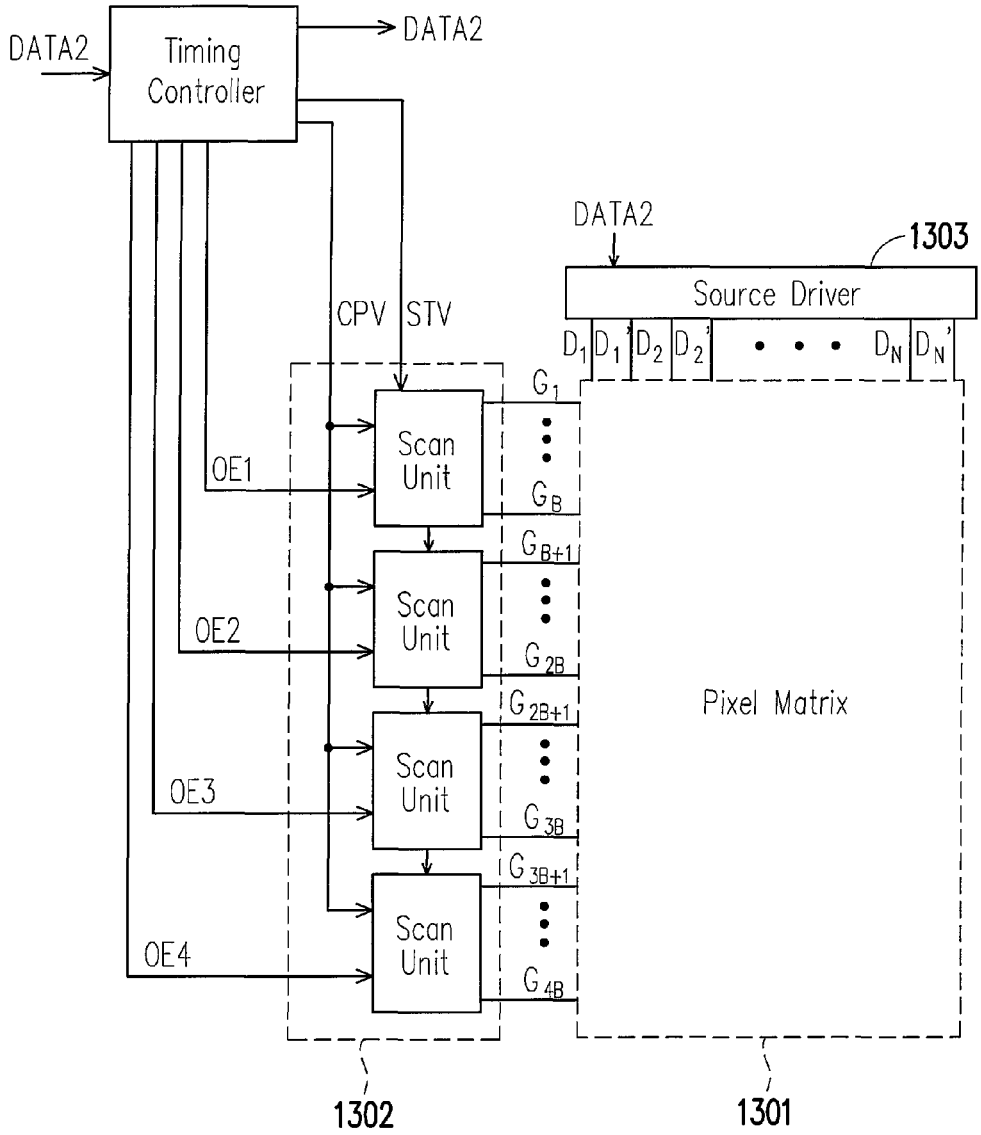
FIG. 13 is a schematic view of the architecture of the display panel of FIG. 3 according to yet another embodiment.

Persons skilled in the art should understand that a single source driver can also be used to drive the data lines as shown in FIG. 13, in addition to using two source drivers to drive the data lines with as described in the above embodiments. FIG. 13 shows yet another embodiment of the display panel of FIG. 3. The coupling manner of the pixels in a pixel matrix 1301 can be the same as the architecture of FIG. 4 or FIG. 9. Likewise, each scan unit of the gate driver 1302 is responsible for driving B scan lines, where B is a positive integer. However, the source driver 1303 is responsible for driving all of the sub-data lines, i.e., $D_1$-$D_N$ and $D_{1'}$-$D_{N'}$. No matter the coupling manner of the pixels of FIG. 13 uses the architecture of FIG. 4 or FIG. 9 or not, the above driving method can be utilized, which will not be described herein again.

Though the display panel having 16×N, 32×N or B×N pixels is taken as an example in the above embodiments, users should understand that the present invention can also be implemented if the display panel includes M×N pixels. Here, M is also a positive integer, and B<M. In addition, it is not limited to define every two or every four image segments as one group, users can define every K image segments as a group freely, where K is a positive integer.

Figure 14:
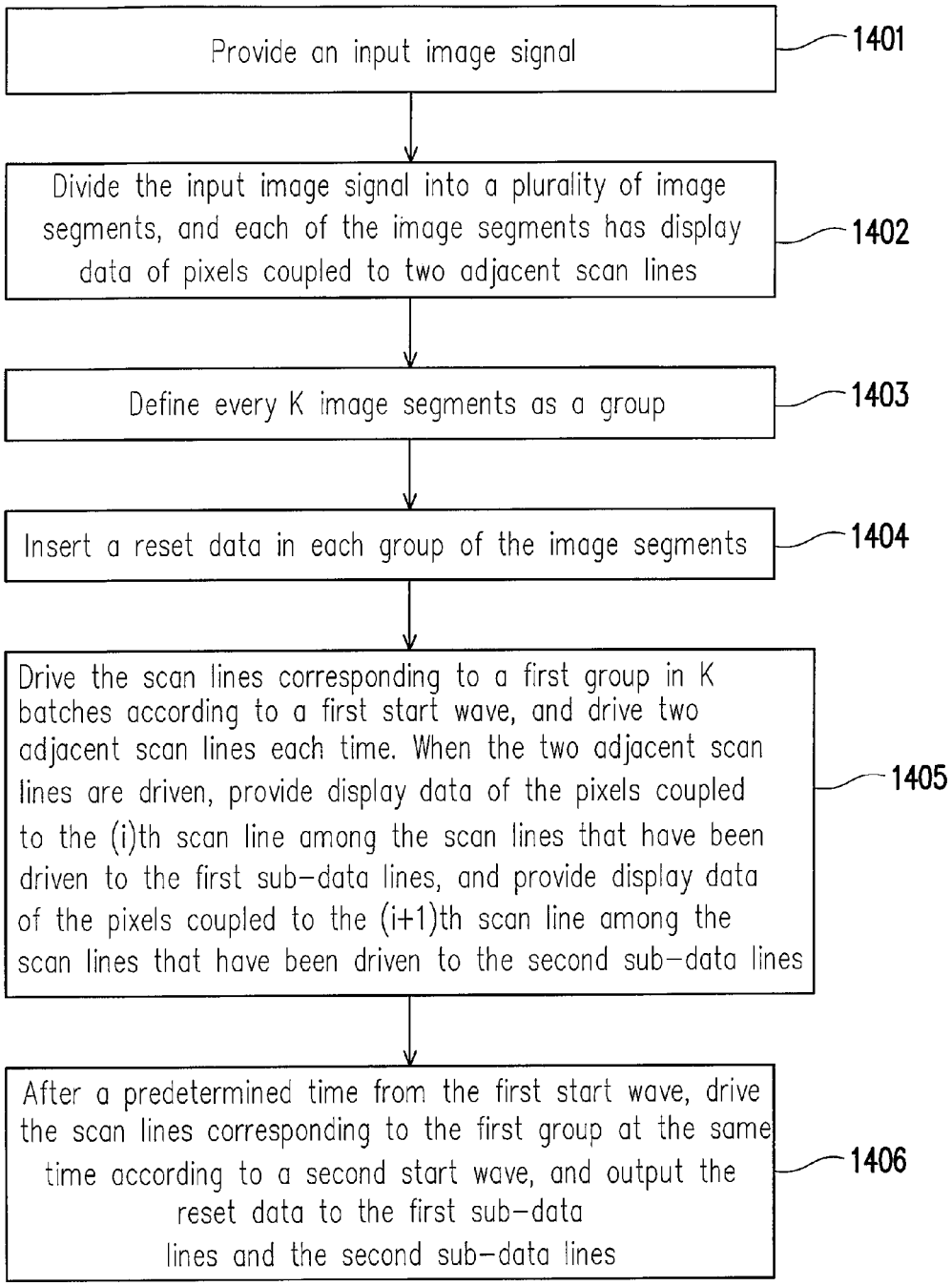
FIG. 14 is a schematic view of processes of a method for driving a display panel according to an embodiment of the present invention.

Basic processes of the operation can be concluded according to the teaching of the above embodiments, as shown in FIG. 14. FIG. 14 is a schematic view of the processes of the method for driving a display panel according to an embodiment of the present invention. First, an input image signal is provided (Step 1401). Next, the input image signal is divided into a plurality of image segments, and each of the image segments has display data of pixels coupled to two adjacent scan lines (Step 1402). Then, every K image segments are defined as a group (Step 1403). After that, a reset data is inserted into each group of the image segments (Step 1404). Then, the scan lines corresponding to a first group are driven in K batches according to the first start wave, and the two adjacent scan lines are driven each time. When the two adjacent scan lines are driven, display data of the pixels coupled to the (i)th scan line among the scan lines that have been driven is provided to the first sub-data lines, and display data of the pixels coupled to the (i+1)th scan line among the scan lines that have been driven is provided to the second sub-data lines (Step 1405). Afterwards, after a predetermined time from the first start wave, the scan lines corresponding to the first group are driven at the same time according to a second start wave, and the reset data is output to the first sub-data lines and the second sub-data lines (Step 1406).

To sum up, the present invention adopts a special display panel, in which each column of the data line includes two sub-data lines. Moreover, the present invention divides the input image signal into a plurality of image segments, and each of the image segments has display data of pixels coupled to two adjacent scan lines. Next, every K image segments are defined as a group, and a reset data is inserted into each group of the image segments, so as to form an image signal. After that, display data of a first group are written in K batches according to the first start wave. After a predetermined time from the first start wave, the scan lines corresponding to the first group are driven at the same time according to a second start wave, and the reset data is output to the first sub-data lines and the second sub-data lines. Thus, the present invention can provide double frame rate, and can effectively eliminate motion blur. In addition, as the polarities of the sub-data lines do not change in a frame, the present invention can reset the data of the pixels of several adjacent scan lines at the same time.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display apparatus, comprising:

a display panel, comprising:

[M rows of] *a plurality of* scan lines[, where M is a positive integer];

[N columns of] *a plurality of* data lines[, wherein each column of the data line drives M rows of pixels and comprises a first sub-data line and a second sub-data line, where N is a positive integer]; and

[M×N] *a plurality of* pixels, arranged in a matrix[, wherein a pixel at an (i)th row and a (j)th column is denoted by P(i, j), where i and j are integers, 1≤i≤M, and 1≤j≤N; the first sub-data line of the (j)th column and an (i)th scan line are coupled to the pixel P(i, j), and the second sub-data line of the (j)th column and an (i+1)th scan line are coupled to a pixel P(i+1, j)];

a gate driver, for driving the scan lines; *and* a [first] source driver[; and a second source driver, wherein the first source driver and the second source driver are used to control the first sub-data lines and the second sub-data lines respectively, and output] *section for receiving* an image signal, the image signal has a plurality of image segments, [and each image segment has display data of pixels coupled to two adjacent scan lines,]

wherein every K image segments are defined as a group, K is a positive integer, and each group of the image segments has a reset data, wherein the gate driver drives the scan lines corresponding to a first group in K batches according to a first start wave, a propagating gate driving signals which propagates down columns of pixels as a wave to enable a group of scan units at a time, [and drives two adjacent scan lines each time upon reception of the first start wave, and when the two adjacent scan lines are driven, the first source driver outputs the display data corresponding to the pixels coupled to the (i)th scan line among the scan lines that have been driven, and the second source driver outputs the display data corresponding to the pixels coupled to the (i+1)th scan line among the scan lines that have been driven,]

wherein after the first group receiving the first start wave for a predetermined time, the gate driver drives the scan lines corresponding to the first group at the same time upon reception of a second start wave, another propagating gate driving signals which propagates down columns of pixels as a wave to enable a group of scan lines at a time[, and then the first source driver and the second source driver output the reset data to the first sub-data lines and the second sub-data lines, respectively].

2. The display apparatus as claimed in claim 1, further comprising:

an arithmetic unit, generating the reset data according to an input image signal and a counting relation, wherein the counting relation is related to K image segments;

a data reorganization unit, coupled to the arithmetic unit, for receiving the input image signal and the reset data, and reorganizing the input image signal and the reset data, so as to generate the image signal; and a timing controller, receiving the image signal, so as to generate the first start wave and the second start wave, wherein the timing controller sends the first start wave and the second start wave to the gate driver, and sends the image signal to the [first] source driver [and the second source driver] *section*, wherein the timing controller controls the gate driver[, the first source driver,] and the [second] source driver *section* according to the image signal, such that [when] the [first] source driver [and the second source driver output] *section drives the data lines according to* the image segments of the image signal, *and* the gate driver drives the scan lines corresponding to the image segments, and [when] the [first] source driver [and the second source driver output] *section drives the data lines according to* the reset data of the image signal, *and* the gate driver drives the scan lines corresponding to the reset data.

3. The display apparatus as claimed in claim 1, wherein the first start wave is an image segment start wave of a gate start driving signal, the second start wave is a reset data start wave of the gate start driving signal, and the reset data start wave is the predetermined time after the image segment start wave.

4. The display apparatus as claimed in claim 1, wherein the reset data is an image data of any single grayscale.

[5. A display apparatus, comprising:

a display panel, comprising:

M rows of scan lines, where M is a positive integer;

N columns of data lines, wherein each column of the data line drives M rows of pixels and comprises a first sub-data line and a second sub-data line, and N is a positive integer; and M×N pixels, arranged in a matrix, wherein a pixel at an (i)th row and a (j)th column is denoted by P(i, j), where i and j are integers, and $1 \le i \le M$, and $1 \le j \le N$; the first sub-data line of the (j)th column is coupled to the pixel P(i, j) at a coupling point of an (i)th scan line, a pixel P(i+1, j) at a coupling point of an (i+1)th scan line, till a pixel P(i+n, j) at a coupling point of an (i+n)th scan line, and the second sub-data line of the (j)th column is coupled to a pixel P(i+n+1, j) at a coupling point of an (i+n+1)th scan line, a pixel P(i+n+2, j) at a coupling point of an (i+n+2)th scan line, till a pixel P(i+2n+1, j) at a coupling point of an (i+2n+1)th scan line, where n is a positive integer;

a gate driver, for driving the scan lines;

a first source driver; and a second source driver, wherein the first source driver and the second source driver are used to control the first sub-data lines and the second sub-data lines respectively, and output an image signal, the image signal has a plurality of image segments, and each image segment has display data of pixels coupled to two adjacent scan lines, wherein every K image segments are defined as a group, K is a positive integer, and each group of the image segments has a reset data, wherein the gate driver drives the scan lines corresponding to a first group in K batches according to a first start wave, a propagating gate driving signals which propagates down columns of pixels as a wave to enable a group of scan units at a time, and drives two adjacent scan lines each time upon reception of the start wave, and when the two adjacent scan lines are driven, the first source driver outputs the display data corresponding to the pixels coupled to the (i+n)th scan line among the scan lines that have been driven, and the second source driver outputs the display data corresponding to the pixels coupled to the (i+n+1)th scan line among the scan lines that have been driven, wherein after the first group receiving the first start wave for a predetermined time, the gate driver drives the scan lines corresponding to the first group at the same time upon reception of a second start wave, another propagating gate driving signals which propagates down columns of pixels as a wave to enable a group of scan lines at a time, and then the first source driver and the second source driver output the reset data to the first sub-data lines and the second sub-data lines, respectively.]

[6. The display apparatus as claimed in claim 5, further comprising:

an arithmetic unit, generating the reset data according to an input image signal and a counting relation, wherein the counting relation is related to K image segments;

a data reorganization unit, coupled to the arithmetic unit, for receiving the data enable signal, the input image signal, a clock signal, and the reset data, and reorganizing the input image signal and the reset data, so as to generate the image signal; and a timing controller, receiving the image signal to generate the first start wave and the second start wave, wherein the timing controller sends the first start wave and the second start wave to the gate driver, and sends the image signal to the first source driver and the second source driver, wherein the timing controller controls the gate driver, the first source driver, and the second source driver according to the image signal, such that when the first source driver and the second source driver output the image segments of the image signal, the gate driver drives the scan lines corresponding to the image segments, and when the first source driver and the second source driver output the reset data of the image signal, the gate driver drives the scan lines corresponding to the reset data.]

[7. The display apparatus as claimed in claim 5, wherein the first start wave is an image segment start wave of a gate start driving signal, the second start wave is a reset data start wave of the gate start driving signal, and the reset data start wave is the predetermined time after the image segment start wave.]

[8. The display apparatus as claimed in claim 5, wherein the reset data is an image data of any single grayscale.]

[9. A display apparatus, comprising:

a display panel, comprising:

M rows of scan lines, where M is a positive integer;

N columns of data lines, wherein each column of the data line drives M rows of pixels and comprises a first sub-data line and a second sub-data line, and N is a positive integer; and M×N pixels, arranged in a matrix, wherein a pixel at an (i)th row and a (j)th column is denoted by P(i, j), where i and j are integers, and $1 \leq i \leq M$, and $1 \leq j \leq N$; the first sub-data line of a (j)th column and an (i)th scan line are coupled to the pixel P(i, j), and the second sub-data line of the (j)th column and an (i+1)th scan line are coupled to a pixel P(i+1, j);

a gate driver, for driving the scan lines; and a source driver, for controlling the first sub-data lines and the second sub-data lines, and outputting an image signal, wherein the image signal has a plurality of image segments, and each image segment has display data of pixels coupled to two adjacent scan lines, wherein every K image segments are defined as a group, K is a positive integer, and each group of the image segments has a reset data, wherein the gate driver drives the scan lines corresponding to a first group in K batches according to a first start wave, a propagating gate driving signals which propagates down columns of pixels as a wave to enable a group of scan units at a time, and drives two adjacent scan lines each time upon reception of the start wave, and when the two adjacent scan lines are driven, the source driver outputs the display data corresponding to the pixels coupled to the (i)th scan line among the scan lines that have been driven to the first sub-data lines, and outputs the display data corresponding to the pixels coupled to the (i+1)th scan line among the scan lines that have been driven to the second sub-data lines, wherein after the first group receiving the first start wave for a predetermined time, the gate driver drives the scan lines corresponding to the first group at the same time upon reception of a second start wave, another propagating gate driving signals which propagates down columns of pixels as a wave to enable a group of scan lines at a time, and then the source driver outputs the reset data to the first sub-data lines and the second sub-data lines.]

[10. The display apparatus as claimed in claim 9, further comprising:

an arithmetic unit, generating the reset data according to an input image signal and a counting relation, wherein the counting relation is related to K image segments;

a data reorganization unit, coupled to the arithmetic unit, for receiving the data enable signal, the input image signal, a clock signal, and the reset data, and reorganizing the input image signal and the reset data, so as to generate the image signal; and a timing controller, receiving the image signal, so as to generate the first start wave and the second start wave, wherein the timing controller sends the first start wave and the second start wave to the gate driver, and sends the image signal to the source driver, wherein the timing controller controls the gate driver and the source driver according to the image signal, such that when the source driver outputs the image segments of the image signal, the gate driver drives the scan lines corresponding to the image segments, when the source driver outputs the reset data of the image signal, the gate driver drives the scan lines corresponding to the reset data.]

[11. The display apparatus as claimed in claim 9, wherein the first start wave is an image segment start wave of a gate start driving signal, the second start wave is a reset data start wave of the gate start driving signal, and the reset data start wave is the predetermined time after the image segment start wave.]

[12. The display apparatus as claimed in claim 9, wherein the reset data is an image data of any single grayscale.]

[13. A display apparatus, comprising:

a display panel, comprising:

M rows of scan lines, where M is a positive integer;

N columns of data lines, wherein each column of the data line drives M rows of pixels and comprises a first sub-data line and a second sub-data line, and N is a positive integer; and M×N pixels, arranged in a matrix, wherein a pixel at an (i)th row and a (j)th column is denoted by P(i, j), where i and j are integers, $1 \leq i \leq M$, and $1 \leq j \leq N$; the first sub-data line in the (j)th column is coupled to the pixel P(i, j) at a coupling point of an (i)th scan line, a pixel P(i+1, j) at a coupling point of an (i+1)th scan line, till a pixel P(i+n, j) at a coupling point of an (i+n)th scan line, and the second sub-data line of the (j)th column is coupled to a pixel P(i+n+1, j) at a coupling point of an (i+n+1)th scan line, a pixel P(i+n+2, j) at a coupling point of an (i+n+2)th scan line, till a pixel P(i+2n+1, j) at a coupling point of an (i+2n+1)th scan line, where n is a positive integer;

a gate driver, for driving the scan lines; and a source driver, for controlling the first sub-data lines and the second sub-data lines, and outputting an image signal, wherein the image signal has a plurality of image segments, and each image segment has display data of pixels coupled to two adjacent scan lines, wherein every K image segments are defined as a group, K is a positive integer, and each group of the image segments has a reset data, wherein the gate driver drives the scan lines corresponding to a first group in K batches according to a first start wave, a propagating gate driving signals which propagates down columns of pixels as a wave to enable a group of scan units at a time, and drives two adjacent scan lines each time upon reception of the start wave, and when the two adjacent scan lines are driven, the source driver outputs the display data corresponding to the pixels coupled to the (i+n)th scan line among the scan lines that have been driven to the first sub-data lines, and outputs the display data corresponding to the pixels coupled to the (i+n+1)th scan line among the scan lines that have been driven to the second sub-data lines, wherein after the first group receiving the first start wave for a predetermined time, the gate driver drives the scan lines corresponding to the first group at the same time according to a second start wave, another propagating gate driving signals which propagates down columns of pixels as a wave to enable a group of scan lines at a time, and then the source driver outputs the reset data to the first sub-data lines and the second sub-data lines.]

[14. The display apparatus as claimed in claim 13, further comprising:

an arithmetic unit, generating the reset data according to an input image signal and a counting relation, wherein the counting relation is related to K image segments;

a data reorganization unit, coupled to the arithmetic unit, for receiving the data enable signal, the input image signal, a clock signal, and the reset data, and reorganizing the input image signal and the reset data, so as to generate the image signal; and a timing controller, receiving the image signal, so as to generate the first start wave and the second start wave, wherein the timing controller sends the first start wave and the second start wave to the gate driver, and sends the image signal to the source driver, wherein the timing controller controls the gate driver and the source driver according to the image signal, such that when the source driver outputs the image segments of the image signal, the gate driver drives the scan lines corresponding to the image segments, and when the source driver outputs the reset data of the image signal, the gate driver drives the scan lines corresponding to the reset data.]

[15. The display apparatus as claimed in claim 13, wherein the first start wave is an image segment start wave of a gate start driving signal, the second start wave is a reset data start wave of the gate start driving signal, and the reset data start wave is the predetermined time after the image segment start wave.]

[16. The display apparatus as claimed in claim 13, wherein the reset data is an image data of any single grayscale.]

17. A method for driving a display panel, wherein the display panel comprises [M rows of] *a plurality of* scan lines, [N columns of] *a plurality of* data lines, and [M×N] *a plurality of* pixels[, and each column of the data line drives M rows of pixels and comprises a first sub-data line and a second sub-data line, the pixels are] arranged in a matrix, [a pixel at an (i)th row and a (j)th column is denoted by P(i, j), where 1≤i≤M, and 1≤j≤N, the first sub-data line of the (j)th column and an (i)th scan line are coupled to the pixel P(i, j), and the second sub-data line of the (j)th column and an (i+1)th scan line are coupled to a pixel P(i+1, j), where N, M, i, and j are positive integers,] the driving method comprising:

providing an [input] image signal[;

dividing the input image signal into] *having* a plurality of image segments, wherein each image segment has display data of pixels coupled to two adjacent scan lines[;

defining], *wherein* every K image segments *are defined* as a group, where K is a positive integer[;] *and*

[inserting] a reset data *is inserted* into each group of the image segments;

driving the scan lines corresponding to a first group in K batches according to a first start wave, a propagating gate driving signals which propagates down columns of pixels as a wave to enable a group of scan units at a time[, and driving two adjacent scan lines each time upon reception of the start wave, and wherein when the two adjacent scan lines are driven, display data of the pixels coupled to the (i)th scan line among the scan lines that have been driven is provided to the first sub-data lines, and display data of the pixels coupled to the (i+1)th scan line among the scan lines that have been driven is provided to the second sub-data lines]; and after the first group receiving the first start wave for a predetermined time, driving the scan lines corresponding to the first group at the same time according to a second start wave, another propagating gate driving signals which propagates down columns of pixels as a wave to enable a group of scan lines at a time[and then outputting the reset data to the first sub-data lines and the second sub-data lines].

18. The method for driving a display panel as claimed in claim 17, wherein the first start wave is an image segment start wave of a gate start driving signal, the second start wave is a reset data start wave of the gate start driving signal, and the reset data start wave is the predetermined time after the image segment start wave.

19. The method for driving a display panel as claimed in claim 17, wherein the reset data is an image data of any single grayscale.

[20. A method for driving a display panel, wherein the display panel comprises M rows of scan lines, N columns of data lines, and M×N pixels, and each column of the data line drives M rows of pixels and comprises a first sub-data line and a second sub-data line, the pixels are arranged in a matrix, a pixel at an (i)th row and a (j)th column is denoted by P(i, j), where 1≤i≤M, and 1≤j≤N, the first sub-data line of the (j)th column is coupled to the pixel P(i, j) at a coupling point of the (i)th scan line, a pixel P(i+1, j) at a coupling point of an (i+1)th scan line, till a pixel P(i+n, j) at a coupling point of an (i+n)th scan line, and the second sub-data line of the (j)th column is coupled to a pixel P(i+n+1, j) at a coupling point of an (i+n+1)th scan line, a pixel P(i+n+2, j) at a coupling point of an (i+n+2)th scan line, till a pixel P(i+2n+1, j) at a coupling point of an (i+2n+1)th scan line, where N, M, i, j, and n are positive integers, the driving method comprising:

providing an input image signal;

dividing the input image signal into a plurality of image segments, wherein each image segment has display data of pixels coupled to two adjacent scan lines;

defining every K image segments as a group, where K is a positive integer;

inserting a reset data into each group of the image segments;

driving the scan lines corresponding to a first group in K batches according to a first start wave, a propagating gate driving signals which propagates down columns of pixels as a wave to enable a group of scan units at a time, and driving two adjacent scan lines each time upon reception of the start wave, and wherein when the two adjacent scan lines are driven, display data of the pixels coupled to the (i+n)th scan line among the scan lines that have been driven is provided to the first sub-data lines, and display data of the pixels coupled to the (i+n+1)th scan line among the scan lines that have been driven is provided to the second sub-data lines; and after the first group receiving the first start wave for a predetermined time, driving the scan lines corresponding to the first group at the same time according to a second start wave, another propagating gate driving signals which propagates down columns of pixels as a wave to enable a group of scan lines at a time and outputting the reset data to the first sub-data lines and the second sub-data lines.]

[21. The method for driving a display panel as claimed in claim 20, wherein the first start wave is an image segment start wave of a gate start driving signal, the second start wave is a reset data start wave of the gate start driving signal, and the reset data start wave is the predetermined time after the image segment start wave.]

[22. The method for driving a display panel as claimed in claim 20, wherein the reset data is an image data of any single grayscale.]

*23. The display apparatus as claimed in claim 1,*

*wherein each column of the data line comprises a first sub-data line and a second sub-data line, and the source driver section comprise a first source driver and a second source driver; the first source driver and the second source driver are used to control the first sub-data lines and the second sub-data lines respectively, and each image segment has display data of pixels coupled to two adjacent scan lines; and the first source driver and the second source driver output the reset data to the first sub-data lines and the second sub-data lines, respectively.*

*24. The display apparatus as claimed in claim 23,*

*wherein the plurality of scan lines comprise M rows of scan lines, where M is a positive integer; the plurality of data lines comprise N columns of data lines, wherein each column of the data line drives M rows of pixels, where N is a positive integer; and the plurality of pixels comprise M×N pixels, arranged in the matrix, wherein a pixel at an (i)th row and a (j)th column is denoted by P(i, j), where i and j are integers, 1≤i≤M, and 1≤j≤N; the first sub-data line of the (j)th column and an (i)th scan line are coupled to the pixel P(i, j), and the second sub-data line of the (j)th column and an (i+1)th scan line are coupled to a pixel P(i+1, j); and*

*wherein the gate driver drives two adjacent scan lines each time upon reception of the first start wave, and when the two adjacent scan lines are driven, the first source driver outputs the display data corresponding to the pixels coupled to the (i)th scan line among the scan lines that have been driven, and the second source driver outputs the display data corresponding to the pixels coupled to the (i+1)th scan line among the scan lines that have been driven.*

*25. The display apparatus as claimed in claim 23,*

*wherein the plurality of scan lines comprise M rows of scan lines, where M is a positive integer; the plurality of data lines comprise N columns of data lines, wherein each column of the data line drives M rows of pixels, where N is a positive integer; and the plurality of pixels comprise M×N pixels, arranged in the matrix, wherein a pixel at an (i)th row and a (j)th column is denoted by P(i, j), where i and j are integers, 1≤i≤M, and 1≤j≤N; the first sub-data line of the (j)th column is coupled to the pixel P(i, j) at a coupling point of an (i)th scan line, a pixel P(i+1, j) at a coupling point of an (i+1)th scan line, till a pixel P(i+n, j) at a coupling point of an (i+n)th scan line, and the second sub-data line of the (j)th column is coupled to a pixel P(i+n+1, j) at a coupling point of an (i+n+1)th scan line, a pixel P(i+n+2, j) at a coupling point of an (i+n+2)th scan line, till a pixel P(i+2n+1, j) at a coupling point of an (i+2n+1)th scan line, where n is a positive integer; and*

*wherein the gate driver drives two adjacent scan lines each time upon reception of the first start wave, and when the two adjacent scan lines are driven, the first source driver outputs the display data corresponding to the pixels coupled to the (i+n)th scan line among the scan lines that have been driven, and the second source driver outputs the display data corresponding to the pixels coupled to the (i+n+1)th scan line among the scan lines that have been driven.*

*26. The display apparatus as claimed in claim 1,*

*wherein each column of the data line comprises a first sub-data line and a second sub-data line, and the source driver section comprise a source driver for controlling the first sub-data lines and the second sub-data lines respectively, and each image segment has display data of pixels coupled to two adjacent scan lines; and the source driver outputs the reset data to the first sub-data lines and the second sub-data lines.*

*27. The display apparatus as claimed in claim 26,*

*wherein the plurality of scan lines comprise M rows of scan lines, where M is a positive integer; the plurality of data lines comprise N columns of data lines, wherein each column of the data line drives M rows of pixels, where N is a positive integer; and the plurality of pixels comprise M×N pixels, arranged in the matrix, wherein a pixel at an (i)th row and a (j)th column is denoted by P(i, j), where i and j are integers, 1≤i≤M, and 1≤j≤N; the first sub-data line of the (j)th column and an (i)th scan line are coupled to the pixel P(i, j), and the second sub-data line of the (j)th column and an (i+1)th scan line are coupled to a pixel P(i+1, j); and*

*wherein the gate driver drives two adjacent scan lines each time upon reception of the first start wave, and when the two adjacent scan lines are driven, the source driver outputs the display data corresponding to the pixels coupled to the (i)th scan line among the scan lines that have been driven to the first sub-data lines, and the source driver outputs the display data corresponding to the pixels coupled to the (i+1)th scan line among the scan lines that have been driven to the second sub-data lines.*

*28. The display apparatus as claimed in claim 26,*

*wherein the plurality of scan lines comprise M rows of scan lines, where M is a positive integer; the plurality of data lines comprise N columns of data lines, wherein each column of the data line drives M rows of pixels, where N is a positive integer; and the plurality of pixels comprise M×N pixels, arranged in the matrix, wherein a pixel at an (i)th row and a (j)th column is denoted by P(i, j), where i and j are integers, 1≤i≤M, and 1≤j≤N; the first sub-data line of the (j)th column is coupled to the pixel P(i, j) at a coupling point of an (i)th scan line, a pixel P(i+1, j) at a coupling point of an (i+1)th scan line, till a pixel P(i+n, j) at a coupling point of an (i+n)th scan line, and the second sub-data line of the (j)th column is coupled to a pixel P(i+n+1, j) at a coupling point of an (i+n+1)th scan line, a pixel P(i+n+2, j) at a coupling point of an (i+n+2)th scan line, till a pixel P(i+2n+1, j) at a coupling point of an (i+2n+1)th scan line, where n is a positive integer; and*

*wherein the gate driver drives two adjacent scan lines each time upon reception of the first start wave, and when the two adjacent scan lines are driven, the source driver outputs the display data corresponding to the pixels coupled to the (i+n)th scan line among the scan lines that have been driven to the first sub-data lines, and the source driver outputs the display data corre-*

*sponding to the pixels coupled to the (i+n+1)th scan line among the scan lines that have been driven to the second sub-data lines.*

*29. The method for driving a display panel as claimed in claim 17, wherein each column of the data line comprises a first sub-data line and a second sub-data line, and the driving method further comprises:*

*after the first group receiving the first start wave for the predetermined time, outputting the reset data to the first sub-data lines and the second sub-data lines.*

*30. The method for driving a display panel as claimed in claim 29, wherein the plurality of scan lines comprise M rows of scan lines, the plurality of data lines comprise N columns of data lines, and the plurality of pixels comprise M×N pixels, and each column of the data line drives M rows of pixels, a pixel at an (i)th row and a (j)th column is denoted by P(i, j), where 1≤i≤M, and 1≤j≤N, the first sub-data line of the (j)th column and an (i)th scan line are coupled to the pixel P(i, j), and the second sub-data line of the (j)th column and an (i+1)th scan line are coupled to a pixel P(i+1, j), where N, M, i, and j are positive integers, and the driving method further comprises:*

*driving two adjacent scan lines each time upon reception of the start wave, and wherein when the two adjacent scan lines are driven, display data of the pixels coupled to the (i)th scan line among the scan lines that have been driven is provided to the first sub-data lines, and display data of the pixels coupled to the (i+1)th scan line among the scan lines that have been driven is provided to the second sub-data lines.*

*31. The method for driving a display panel as claimed in claim 29, wherein the plurality of scan lines comprise M rows of scan lines, the plurality of data lines comprise N columns of data lines, and the plurality of pixels comprise M×N pixels, and each column of the data line drives M rows of pixels, a pixel at an (i)th row and a (j)th column is denoted by P(i, j), where 1≤i≤M, and 1≤j≤N, the first sub-data line of the (j)th column is coupled to the pixel P(i, j) at a coupling point of the (i)th scan line, a pixel P(i+1, j) at a coupling point of an (i+1)th scan line, till a pixel P(i+n, j) at a coupling point of an (i+n)th scan line, and the second sub-data line of the (j)th column is coupled to a pixel P(i+n+1, j) at a coupling point of an (i+n+1)th scan line, a pixel P(i+n+2, j) at a coupling point of an (i+n+2)th scan line, till a pixel P(i+2n+1, j) at a coupling point of an (i+2n+1)th scan line, where N, M, i, j, and n are positive integers, and the driving method further comprises:*

*driving two adjacent scan lines each time upon reception of the start wave, and wherein when the two adjacent scan lines are driven, display data of the pixels coupled to the (i+n)th scan line among the scan lines that have been driven is provided to the first sub-data lines, and display data of the pixels coupled to the (i+n+1)th scan line among the scan lines that have been driven is provided to the second sub-data lines.*

*32. A display apparatus, comprising:*

*a display panel, comprising:*

*a plurality of scan lines, driven according to a first start wave and a second start wave, wherein the first start wave and the second start wave are configured to drive a same group of the scan lines;*

*a plurality of data lines, wherein each column of the data line comprises a first sub-data line and a second sub-data line; and*

*a plurality of pixels, arranged in a matrix, wherein a pixel at an (i)th row and a (j)th column is denoted by P(i, j), where i and j are integers; the first sub-data line of the (j)th column and an (i)th scan line are coupled to the pixel P(i, j), and the second sub-data line of the (j)th column and an (i+1)th scan line are coupled to a pixel P(i+1, j);*

*a first source driver; and*

*a second source driver, wherein the first source driver and the second source driver are configured to control the first sub-data lines and the second sub-data lines respectively, wherein the first start wave propagates down columns of pixels as a wave to enable a group of scan lines at a time, and the second start wave propagates down columns of pixels as a wave to enable a group of the scan lines at a time.*

*33. The display apparatus as claimed in claim 32, wherein two adjacent scan lines are configured to be simultaneously driven each time, in which the first source driver is configured to output the display data corresponding to the pixels coupled to the (i)th scan line among the scan lines that have been driven, and the second source driver is configured to output the display data corresponding to the pixels coupled to the (i+1)th scan line among the scan lines that have been driven.*

*34. The display apparatus as claimed in claim 32, wherein the first source driver and the second source driver are configured to control the first and second sub-data lines according to an input image signal having a plurality of image segments, wherein each image segment has display data of pixels coupled to two adjacent scan lines.*

*35. The display apparatus as claimed in claim 34, further comprising:*

*a data reorganization unit, configured to receive the input image signal and reorganize the input image signal so as to generate an image signal; and*

*a timing controller, configured to be coupled to the data reorganization unit and configured to send the image signal to the display panel.*

*36. The display apparatus as claimed in claim 32, further comprising a gate driver configured to drive the scan lines, wherein the gate driver is configured to drive two adjacent scan lines simultaneously each time.*

*37. The display apparatus as claimed in claim 36, wherein each time when the two adjacent scan lines are simultaneously driven, the first source driver is configured to output the display data corresponding to the pixels coupled to the (i)th scan line among the scan lines that have been driven, and the second source driver outputs the display data corresponding to the pixels coupled to the (i+1)th scan line among the scan lines that have been driven.*

*38. A display panel, comprising:*

*a plurality of scan lines, driven according to a first start wave and a second start wave, wherein the first start wave and the second start wave are configured to drive a same group of the scan lines;*

*a plurality of data lines, wherein each column of the data line comprises a first sub-data line and a second sub-data line; and*

*a plurality of pixels, arranged in a matrix, wherein a pixel at an (i)th row and a (j)th column is denoted by P(i, j), where i and j are integers; the first sub-data line of the (j)th column and an (i)th scan line are coupled to the pixel P(i, j), and the second sub-data line of the (j)th column and an (i+1)th scan line are coupled to a pixel P(i+1, j), wherein the first start wave propagates down columns of pixels as a wave to enable a group of scan lines at a time, and the second start wave propagates down columns of pixels as a wave to enable a group of the scan lines at a time.*

*39. A method for driving a display panel, wherein the display panel comprises a plurality of scan lines; a plurality of data lines, wherein each column of the data line comprises a first sub-data line and a second sub-data line; and a plurality of pixels, arranged in a matrix, wherein a pixel at an (i)th row and a (j)th column is denoted by P(i, j), where i and j are integers; the first sub-data line of the (j)th column and an (i)th scan line are coupled to the pixel P(i, j), and the second sub-data line of the (j)th column and an (i+1)th scan line are coupled to a pixel P(i+1, j), the driving method comprising:*

*providing an image signal, wherein the image signal has a plurality of image segments, and each image segment has display data of pixels coupled to two adjacent scan lines; and*

*driving two adjacent scan lines simultaneously each time according to a first start wave and a second start wave, wherein the first start wave and the second start wave are configured to drive a same group of the scan lines, wherein the first start wave propagates down columns of pixels as a wave to enable a group of scan lines at a time, and the second start wave propagates down columns of pixels as a wave to enable a group of the scan lines at a time.*

*40. The method as claimed in claim 39, further comprising: when the two adjacent scan lines are simultaneously driven, outputting the display data corresponding to the pixels coupled to the (i)th scan line among the scan lines that have been driven, and outputting the display data corresponding to the pixels coupled to the (i+1)th scan line among the scan lines that have been driven.*

*41. A method for driving a display panel, wherein the display panel comprises a plurality of scan lines; a plurality of data lines, wherein each column of the data line comprises a first sub-data line and a second sub-data line; and a plurality of pixels, arranged in a matrix, wherein a pixel at an (i)th row and a (j)th column is denoted by P(i, j), where i and j are integers; the first sub-data line of the (j)th column and an (i)th scan line are coupled to the pixel P(i, j), and the second sub-data line of the (j)th column and an (i+1)th scan line are coupled to a pixel P(i+1, j), the driving method comprising:*

*driving two adjacent scan lines simultaneously each time according to a first start wave and a second start wave, wherein the first start wave and the second start wave are configured to drive a same group of the scan lines; and*

*each time when two adjacent scan lines are simultaneously driven, outputting display data corresponding to the pixels coupled to the (i)th scan line among the scan lines that have been driven, and outputting display data corresponding to the pixels coupled to the (i+1)th scan line among the scan lines that have been driven, wherein the first start wave propagates down columns of pixels as a wave to enable a group of scan lines at a time, and the second start wave propagates down columns of pixels as a wave to enable a group of the scan lines at a time.*

*42. The method as claimed in claim 41, further comprising: providing an input image signal having a plurality of image segments, wherein each image segment has display data of pixels coupled to two adjacent scan lines; providing the display data for outputting to the sub-data lines according to the input image signal, receiving the input image signal and reorganizing the input image signal so as to generate an image signal; and sending the image signal to the display panel.*

* * * * *